United States Patent
Perreault et al.

(10) Patent No.: US 9,660,520 B2
(45) Date of Patent: May 23, 2017

(54) METHOD AND APPARATUS TO PROVIDE POWER CONVERSION WITH HIGH POWER FACTOR

(71) Applicant: Massachusetts Institute of Technology, Cambridge, MA (US)

(72) Inventors: David J. Perreault, Andover, MA (US); Seungbum Lim, Cambridge, MA (US); David M. Otten, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/758,033

(22) PCT Filed: Apr. 8, 2014

(86) PCT No.: PCT/US2014/033267
§ 371 (c)(1),
(2) Date: Jun. 26, 2015

(87) PCT Pub. No.: WO2014/168911
PCT Pub. Date: Oct. 16, 2014

(65) Prior Publication Data
US 2015/0357912 A1 Dec. 10, 2015

Related U.S. Application Data

(60) Provisional application No. 61/809,920, filed on Apr. 9, 2013.

(51) Int. Cl.
*H02M 1/32* (2007.01)
*H02M 1/42* (2007.01)
(Continued)

(52) U.S. Cl.
CPC ....... *H02M 1/4241* (2013.01); *H02M 1/4208* (2013.01); *H02M 1/4225* (2013.01);
(Continued)

(58) Field of Classification Search
CPC ....... H02M 3/33569; H02M 2001/007; H02M 2001/0074; H02M 1/42; H02M 1/4208;
(Continued)

(56) References Cited

U.S. PATENT DOCUMENTS 3,370,215 A 2/1968 Light, Jr.
3,745,437 A 7/1973 Brown
(Continued)

FOREIGN PATENT DOCUMENTS

DE 103 58 299 A1 7/2005
EP 0 513 920 A2 11/1992
(Continued)

OTHER PUBLICATIONS

U.S. Appl. No. 14/708,903, filed May 11, 2015, Giuliano et al.
(Continued)

*Primary Examiner* — Yemane Mehari
(74) *Attorney, Agent, or Firm* — Daly, Crowley, Mofford & Durkee, LLP

(57) ABSTRACT

A power converter circuit rectifies a line voltage and applies the rectified voltage to a stack of capacitors. Voltages on the capacitors are coupled to a plurality of regulating converters to be converted to regulated output signals. The regulated output signals are combined and converted to a desired DC output voltage of the power converter. Input currents of the regulating converters are modulated in a manner that enhances the power factor of the power converter.

23 Claims, 26 Drawing Sheets

(51) Int. Cl.
*H02M 7/06* (2006.01)
*H02M 3/158* (2006.01)
*H02M 3/335* (2006.01)
*H02M 1/00* (2006.01)

(52) U.S. Cl.
CPC ....... *H02M 3/158* (2013.01); *H02M 3/33569* (2013.01); *H02M 7/06* (2013.01); *H02M 2001/007* (2013.01); *H02M 2001/0074* (2013.01); *Y02B 70/126* (2013.01)

(58) Field of Classification Search
CPC .... H02M 1/4225; H02M 1/4241; H02M 7/06; Y02B 70/126; Y02B 70/1475; Y02B 70/1555; Y02B 70/7575
USPC ........................ 363/16, 37, 44, 123–127, 143
See application file for complete search history.

(56) References Cited

U.S. PATENT DOCUMENTS

| | | |
|---|---|---|
| 3,818,360 A | 6/1974 | Boutmy et al. |
| 4,214,174 A | 7/1980 | Dickson |
| 4,513,364 A | 4/1985 | Nilssen |
| 4,812,961 A | 3/1989 | Essaff et al. |
| 4,903,181 A | 2/1990 | Seidel |
| 5,057,986 A | 10/1991 | Henze et al. |
| 5,119,283 A * | 6/1992 | Steigerwald ............ H02M 1/10 323/207 |
| 5,132,606 A | 7/1992 | Herbert |
| 5,159,539 A | 10/1992 | Koyama |
| 5,198,970 A | 3/1993 | Kawabata et al. |
| 5,268,832 A | 12/1993 | Kandatsu |
| 5,301,097 A | 4/1994 | McDaniel |
| 5,331,303 A | 7/1994 | Shiota |
| 5,402,329 A | 3/1995 | Wittenbreder |
| 5,557,193 A | 9/1996 | Kajimoto |
| 5,661,348 A | 8/1997 | Brown |
| 5,717,581 A | 2/1998 | Canclini |
| 5,737,201 A | 4/1998 | Meynard et al. |
| 5,761,058 A | 6/1998 | Kanda et al. |
| 5,793,626 A | 8/1998 | Jiang |
| 5,801,987 A | 9/1998 | Dinh |
| 5,812,017 A | 9/1998 | Golla et al. |
| 5,831,846 A | 11/1998 | Jiang |
| 5,892,395 A | 4/1999 | Stengel et al. |
| 5,907,484 A | 5/1999 | Kowshik et al. |
| 5,956,243 A | 9/1999 | Mao |
| 5,959,565 A | 9/1999 | Taniuchi et al. |
| 5,978,283 A | 11/1999 | Hsu et al. |
| 5,982,645 A | 11/1999 | Levran et al. |
| 6,107,864 A | 8/2000 | Fukushima et al. |
| 6,133,788 A | 10/2000 | Dent |
| 6,140,807 A | 10/2000 | Vannatta et al. |
| 6,154,380 A | 11/2000 | Assow et al. |
| 6,157,253 A | 12/2000 | Sigmon et al. |
| 6,178,102 B1 * | 1/2001 | Stanley ................... H02M 7/19 323/901 |
| 6,198,645 B1 | 3/2001 | Kotowski et al. |
| 6,255,906 B1 | 7/2001 | Eidson et al. |
| 6,275,018 B1 | 8/2001 | Telefus et al. |
| 6,327,462 B1 | 12/2001 | Loke et al. |
| 6,339,538 B1 | 1/2002 | Handleman |
| 6,377,117 B2 | 4/2002 | Oskowsky et al. |
| 6,396,341 B1 | 5/2002 | Pehlke |
| 6,476,666 B1 | 11/2002 | Palusa et al. |
| 6,486,728 B2 | 11/2002 | Kleveland |
| 6,501,325 B1 | 12/2002 | Meng |
| 6,504,422 B1 | 1/2003 | Rader et al. |
| 6,507,503 B2 | 1/2003 | Norrga |
| 6,515,612 B1 | 2/2003 | Abel |
| 6,563,235 B1 | 5/2003 | McIntyre et al. |
| 6,650,552 B2 | 11/2003 | Takagi et al. |
| 6,700,803 B2 | 3/2004 | Krein |
| 6,738,277 B2 | 5/2004 | Odell |
| 6,738,432 B2 | 5/2004 | Pehlke et al. |
| 6,759,766 B2 | 7/2004 | Hiratsuka et al. |
| 6,927,441 B2 | 8/2005 | Pappalardo et al. |
| 6,934,167 B2 | 8/2005 | Jang et al. |
| 6,980,181 B2 | 12/2005 | Sudo |
| 7,072,195 B2 | 7/2006 | Xu |
| 7,091,778 B2 | 8/2006 | Gan et al. |
| 7,103,114 B1 | 9/2006 | Lapierre |
| 7,135,847 B2 | 11/2006 | Taurand |
| 7,145,382 B2 | 12/2006 | Ker et al. |
| 7,157,956 B2 | 1/2007 | Wei |
| 7,161,816 B2 | 1/2007 | Shteynberg et al. |
| 7,190,210 B2 | 3/2007 | Azrai et al. |
| 7,224,062 B2 | 5/2007 | Hsu |
| 7,236,542 B2 | 6/2007 | Matero |
| 7,239,194 B2 | 7/2007 | Azrai et al. |
| 7,250,810 B1 | 7/2007 | Tsen et al. |
| 7,269,036 B2 | 9/2007 | Deng et al. |
| 7,330,070 B2 | 2/2008 | Vaisanen |
| 7,362,251 B2 | 4/2008 | Jensen et al. |
| 7,375,992 B2 | 5/2008 | Mok et al. |
| 7,382,113 B2 | 6/2008 | Wai et al. |
| 7,382,634 B2 | 6/2008 | Buchmann |
| 7,408,330 B2 | 8/2008 | Zhao |
| 7,443,705 B2 | 10/2008 | Ito |
| 7,511,978 B2 | 3/2009 | Chen et al. |
| 7,521,914 B2 | 4/2009 | Dickerson et al. |
| 7,535,133 B2 | 5/2009 | Perreault et al. |
| 7,589,605 B2 | 9/2009 | Perreault et al. |
| 7,595,682 B2 | 9/2009 | Lin et al. |
| 7,616,467 B2 | 11/2009 | Mallwitz |
| 7,633,778 B2 | 12/2009 | Mok et al. |
| 7,696,735 B2 | 4/2010 | Oraw et al. |
| 7,705,681 B2 | 4/2010 | Ilkov |
| 7,724,551 B2 | 5/2010 | Yanagida et al. |
| 7,768,800 B2 | 8/2010 | Mazumduer et al. |
| 7,777,459 B2 | 8/2010 | Williams |
| 7,782,027 B2 | 8/2010 | Williams |
| 7,786,712 B2 | 8/2010 | Williams |
| 7,807,499 B2 | 10/2010 | Nishizawa |
| 7,812,579 B2 | 10/2010 | Williams |
| 7,889,519 B2 | 2/2011 | Perreault et al. |
| 7,907,429 B2 | 3/2011 | Ramadass et al. |
| 7,907,430 B2 | 3/2011 | Kularatna et al. |
| 7,928,705 B2 | 4/2011 | Hooijschuur et al. |
| 7,940,038 B2 | 5/2011 | Da Silva et al. |
| 7,956,572 B2 | 6/2011 | Zane et al. |
| 7,977,921 B2 | 7/2011 | Bahai et al. |
| 7,999,601 B2 | 8/2011 | Schlueter et al. |
| 8,000,117 B2 | 8/2011 | Petricek |
| 8,018,216 B2 | 9/2011 | Kakehi |
| 8,026,763 B2 | 9/2011 | Dawson et al. |
| 8,040,174 B2 | 10/2011 | Likhterov |
| 8,048,766 B2 | 11/2011 | Joly et al. |
| 8,085,524 B2 | 12/2011 | Roozeboom et al. |
| 8,111,054 B2 | 2/2012 | Yen et al. |
| 8,130,518 B2 | 3/2012 | Fishman |
| 8,159,091 B2 | 4/2012 | Yeates |
| 8,164,384 B2 | 4/2012 | Dawson et al. |
| 8,169,797 B2 | 5/2012 | Coccia et al. |
| 8,193,604 B2 | 6/2012 | Lin et al. |
| 8,212,541 B2 | 7/2012 | Perreault et al. |
| 8,276,002 B2 | 9/2012 | Dennard et al. |
| 8,339,184 B2 | 12/2012 | Kok et al. |
| 8,350,549 B2 | 1/2013 | Kitabatake |
| 8,384,467 B1 | 2/2013 | O'Keeffe et al. |
| 8,395,914 B2 | 3/2013 | Klootwijk et al. |
| 8,451,053 B2 | 5/2013 | Perreault et al. |
| 8,456,874 B2 | 6/2013 | Singer et al. |
| 8,503,203 B1 | 8/2013 | Szczeszynski et al. |
| 8,643,347 B2 | 2/2014 | Giuliano et al. |
| 8,659,353 B2 | 2/2014 | Dawson et al. |
| 8,670,254 B2 | 3/2014 | Perreault et al. |
| 8,718,188 B2 | 5/2014 | Balteanu et al. |
| 8,729,819 B2 | 5/2014 | Zhao et al. |
| 8,824,978 B2 | 9/2014 | Briffa et al. |
| 8,829,993 B2 | 9/2014 | Briffa et al. |
| 8,830,709 B2 | 9/2014 | Perreault |
| 8,830,710 B2 | 9/2014 | Perreault et al. |

(56) References Cited

U.S. PATENT DOCUMENTS

| | | | |
|---|---|---|---|
| 8,860,396 B2 | 10/2014 | Giuliano | |
| 8,957,727 B2 | 2/2015 | Dawson et al. | |
| 9,048,727 B2 | 6/2015 | Giuliano et al. | |
| 9,209,758 B2 | 12/2015 | Briffa et al. | |
| 2003/0169096 A1 | 9/2003 | Hsu et al. | |
| 2003/0227280 A1 | 12/2003 | Vinciarelli | |
| 2004/0041620 A1 | 3/2004 | D'Angelo et al. | |
| 2004/0170030 A1 | 9/2004 | Duerbaum et al. | |
| 2004/0222775 A1 | 11/2004 | Muramatsu et al. | |
| 2005/0007184 A1 | 1/2005 | Kamijo | |
| 2005/0088865 A1 | 4/2005 | Lopez et al. | |
| 2005/0207133 A1 | 9/2005 | Pavier et al. | |
| 2005/0213267 A1 | 9/2005 | Azrai et al. | |
| 2005/0286278 A1 | 12/2005 | Perreault et al. | |
| 2007/0035977 A1* | 2/2007 | Odell | H02J 7/0016 363/143 |
| 2007/0066224 A1 | 3/2007 | d'Hont et al. | |
| 2007/0066250 A1 | 3/2007 | Takahashi et al. | |
| 2007/0069818 A1 | 3/2007 | Bhatti et al. | |
| 2007/0091655 A1 | 4/2007 | Oyama et al. | |
| 2007/0123184 A1 | 5/2007 | Nesimoglu et al. | |
| 2007/0146020 A1 | 6/2007 | Williams | |
| 2007/0146090 A1 | 6/2007 | Carey et al. | |
| 2007/0159257 A1 | 7/2007 | Lee et al. | |
| 2007/0171680 A1 | 7/2007 | Perreault et al. | |
| 2007/0210774 A1 | 9/2007 | Kimura et al. | |
| 2007/0230221 A1 | 10/2007 | Lim et al. | |
| 2007/0247222 A1 | 10/2007 | Sorrells et al. | |
| 2007/0247253 A1 | 10/2007 | Carey et al. | |
| 2007/0281635 A1 | 12/2007 | McCallister et al. | |
| 2007/0290747 A1 | 12/2007 | Traylor et al. | |
| 2007/0291718 A1 | 12/2007 | Chan et al. | |
| 2007/0296383 A1 | 12/2007 | Xu et al. | |
| 2008/0001660 A1 | 1/2008 | Rasmussen | |
| 2008/0003960 A1 | 1/2008 | Zolfaghari | |
| 2008/0003962 A1 | 1/2008 | Ngai | |
| 2008/0007333 A1 | 1/2008 | Lee et al. | |
| 2008/0012637 A1 | 1/2008 | Aridas et al. | |
| 2008/0013236 A1 | 1/2008 | Weng | |
| 2008/0019459 A1 | 1/2008 | Chen et al. | |
| 2008/0031023 A1 | 2/2008 | Kitagawa et al. | |
| 2008/0062724 A1 | 3/2008 | Feng et al. | |
| 2008/0150621 A1 | 6/2008 | Lesso et al. | |
| 2008/0157732 A1 | 7/2008 | Williams | |
| 2008/0157733 A1 | 7/2008 | Williams | |
| 2008/0158915 A1 | 7/2008 | Williams | |
| 2008/0239772 A1 | 10/2008 | Oraw et al. | |
| 2009/0059630 A1 | 3/2009 | Williams | |
| 2009/0072800 A1 | 3/2009 | Ramadass et al. | |
| 2009/0102439 A1 | 4/2009 | Williams | |
| 2009/0147554 A1 | 6/2009 | Adest et al. | |
| 2009/0196082 A1 | 8/2009 | Mazumder et al. | |
| 2009/0257211 A1 | 10/2009 | Kontani et al. | |
| 2009/0273955 A1 | 11/2009 | Tseng et al. | |
| 2009/0278520 A1 | 11/2009 | Perreault et al. | |
| 2009/0302686 A1 | 12/2009 | Fishman | |
| 2009/0303753 A1 | 12/2009 | Fu et al. | |
| 2009/0323380 A1 | 12/2009 | Harrison | |
| 2010/0073084 A1 | 3/2010 | Hur et al. | |
| 2010/0085786 A1 | 4/2010 | Chiu et al. | |
| 2010/0110741 A1 | 5/2010 | Lin et al. | |
| 2010/0117612 A1 | 5/2010 | Klootwijk et al. | |
| 2010/0140736 A1 | 6/2010 | Lin et al. | |
| 2010/0142239 A1 | 6/2010 | Hopper | |
| 2010/0201441 A1 | 8/2010 | Gustavsson | |
| 2010/0202161 A1 | 8/2010 | Sims et al. | |
| 2010/0214746 A1 | 8/2010 | Lotfi et al. | |
| 2010/0244189 A1 | 9/2010 | Klootwijk et al. | |
| 2010/0244585 A1 | 9/2010 | Tan et al. | |
| 2010/0308751 A1 | 12/2010 | Nerone | |
| 2011/0001542 A1* | 1/2011 | Ranta | H03M 1/1061 327/382 |
| 2011/0148518 A1 | 6/2011 | Lejon et al. | |
| 2011/0163414 A1 | 7/2011 | Lin et al. | |
| 2011/0181128 A1 | 7/2011 | Perreault et al. | |
| 2012/0043818 A1* | 2/2012 | Stratakos | H02J 3/383 307/77 |
| 2012/0146177 A1 | 6/2012 | Choi et al. | |
| 2012/0153907 A1 | 6/2012 | Carobolante et al. | |
| 2012/0176195 A1 | 7/2012 | Dawson et al. | |
| 2012/0313602 A1 | 12/2012 | Perreault et al. | |
| 2012/0326684 A1 | 12/2012 | Perreault et al. | |
| 2013/0049714 A1 | 2/2013 | Chiu | |
| 2013/0094157 A1 | 4/2013 | Giuliano et al. | |
| 2013/0154600 A1 | 6/2013 | Giuliano et al. | |
| 2013/0241625 A1 | 9/2013 | Perreault et al. | |
| 2013/0343106 A1 | 12/2013 | Perreault et al. | |
| 2013/0343107 A1 | 12/2013 | Perreault | |
| 2014/0118065 A1 | 5/2014 | Briffa et al. | |
| 2014/0118072 A1 | 5/2014 | Briffa et al. | |
| 2014/0120854 A1 | 5/2014 | Briffa et al. | |
| 2014/0167513 A1 | 6/2014 | Chang et al. | |
| 2014/0225581 A1 | 8/2014 | Giuliano et al. | |
| 2014/0226378 A1 | 8/2014 | Perreault | |
| 2014/0306648 A1 | 10/2014 | Le et al. | |
| 2014/0306673 A1 | 10/2014 | Le et al. | |
| 2014/0313781 A1 | 10/2014 | Perreault et al. | |
| 2014/0335805 A1 | 11/2014 | Briffa et al. | |
| 2014/0339918 A1 | 11/2014 | Perreault et al. | |
| 2014/0355322 A1 | 12/2014 | Perreault et al. | |
| 2015/0022173 A1 | 1/2015 | Le et al. | |
| 2015/0023063 A1 | 1/2015 | Perreault et al. | |
| 2015/0084701 A1 | 3/2015 | Perreault et al. | |
| 2015/0097538 A1 | 4/2015 | Le et al. | |
| 2015/0295497 A1 | 10/2015 | Perreault et al. | |
| 2016/0254754 A1 | 9/2016 | Perreault et al. | |

FOREIGN PATENT DOCUMENTS

| | | |
|---|---|---|
| EP | 1 750 366 A2 | 2/2007 |
| EP | 1 750 366 A3 | 2/2007 |
| JP | H10327573 A | 12/1998 |
| JP | H11235053 A | 8/1999 |
| JP | 2002-62858 | 2/2002 |
| JP | 2010/045943 A | 2/2010 |
| WO | WO 2006/093600 A2 | 9/2006 |
| WO | WO 2007/136919 A2 | 11/2007 |
| WO | WO 2007/136919 A3 | 11/2007 |
| WO | WO 2009/112900 A1 | 9/2009 |
| WO | WO 2012151466 A2 | 11/2012 |
| WO | WO 2013/059446 A1 | 4/2013 |
| WO | WO 2013/086445 A1 | 6/2013 |
| WO | WO 2013/096416 A1 | 6/2013 |
| WO | WO 2014/168911 A1 | 10/2014 |

OTHER PUBLICATIONS

U.S. Appl. No. 14/791,685, filed Jul. 6, 2015, Perreault et al.

Alspach; "Solar Power Inverter Manufacturers Get Day in Sun;" Boston Business Journal; Oct. 29, 2010; 1 page.

Denning; "Solar Market is Risking Sunstroke;" Wall Street Journal; Dec. 11-12, 2010, 1 page.

Pierquet, et al.; "A Single-Phase Photovoltaic Inverter Topology with a Series-Connected Power Buffer;" (ECCE), IEEE, Sep. 2010, pp. 1-9.

Trubitsyn, et al.; High-Efficiency Inverter for Photovoltaic Applications; (ECCE), IEEE, Sep. 2010, pp. 1-9.

Bush, et al.; "A Single-Phase Current Source Solar Inverter with Reduced-Size DC Link;" Energy Conversion Congress and Exposition; IEEE; Sep. 20, 2009; 6 Pages.

Krein, et al.; "Cost-Effective Hundred-Year Life for Single-Phase Inverters and Rectifiers in Solar and LED Lighting Applications Based on Minimum Capacitance Requirements and a Ripple Power Port;" Applied Power Electronics Conference and Exposition; IEEE; Feb. 15, 2009; 6 Pages.

Li; "A Review of the Single Phase Photovoltaic Module Integrated Converter Topologies With Three Different DC Link Configurations;" IEEE Transactions on Power Electronics; vol. 23; No. 3; May 2008; 14 Pages.

Invitation to Pay Additional Fees dated Jul. 5, 2011 for International Application No. PCT/US2011/022056; 3 Pages.

(56) References Cited

OTHER PUBLICATIONS

Partial Search Report of the ISA dated Jul. 5, 2011 for International Application No. PCT/US2011/022056; 6 Pages.
PCT Search Report and Written Opinion dated Sep. 23, 2011 for International Application No. PCT/US2011/022056; 15 Pages.
PCT International Preliminary Report on Patentability dated Aug. 2, 2012 for International Application No. PCT/US2011/022056; 9 Pages.
Ozpineci, et al.; "Cycloconverters;" An on-line tutorial for the IEEE Power Electronics Society; http://pels.org/Comm/Education/Tutorials/tutorials.htm; 2001; 17 Pages.
Perreault et al.; "Multi-Phase Grid Interface;" for U.S. Appl. No. 13/795,633, filed Mar. 12, 2013; 41 Pages.
PCT International Search Report and Written Opinion dated May 13, 2013 for International Application No. PCT/US2013/030383; 13 Pages.
PCT International Preliminary Report and Written Opinion dated May 26, 2011 for International Application No. PCT/US2009/063821; 9 Pages.
Amendment to Office Action mailed Apr. 7, 2011 for U.S. Appl. No. 12/680,048; 7 Pages.
PCT Search Report and Written Opinion dated Apr. 13, 2010 for International Application No. PCT/US2009/063821; 16 Pages.
PCT Invitation to Pay Additional Fees dated Feb. 9, 2010 for International Application No. PCT/US2009/063821; 44 Pages.
Xuejun Zhang, et al., "Analysis of Power Recycling Techniques for RF and Microwave Outphasing Power Amplifiers", IEEE Transactions on Circuits and Systems-II: Analog and Digital Signal Porcessing, vol. 49, No. 5, May 2002, 9 Pages.
Sungwon Chung, et al., "Asymmetric Multilevel Outphasing Architecture for Multi-Standard Transmitters", 2009 IEEE Radio Frequency Integrated Circuits Symposium, 4 Pages.
D. Diaz, et al., "Comparison of Two Different Cell Topologies for a Multilevel Power Supply to Achieve High Efficiency Envelope Amplifier", IEEE , 2009, 6 Pages.
M. Rodriguez, et al., "Multilevel Converter for Envelope Tracking in RF Power Amplifiers", IEEE, 2009, 8 Pages.
Yuan-Jyue Chen, et al., "Multilevel LINC System Design for Wireless Transmitters", IEEE, 2007, 4 Pages.
Jinsung Choi, et al., "A $\Delta\Sigma$-Digitized Polar RF Transmitter", IEEE Transactions on Microwave Theory and Techniques, vol. 55, No. 12, Dec. 2007, 12 Pages.
Kai-Yuan Jheng, et. al., "Multilevel LINC System Design for Power Efficiency Enhancement", IEEE, 2007, 4 Pages.
Kevin Tom, et al., "Load-Pull Analysis of Outphasing Class-E Power Amplifier", The $2^{nd}$ International Conference on Wireless Broadband and Ultra Wideband Communications (AusWireless 2007), IEEE, 2007, 4 Pages.
Yehui Han, et al., "Resistance Compression Networks for Radio-Frequency Power Conversion", IEEE Transactions on Power Electronics, vol. 22, No. 1, Jan. 2007, 13 Pages.
Surya Musunuri, et al., "Improvement of Light-Load Efficiency Using Width-Switching Scheme for CMOS Transistors", IEEE Power Electronics Letters, vol. 3, No. 3, Sep. 2005, 6 Pages.
Frederick H. Raab, et al., "RF and Microwave Power Amplifier and Transmitter Technologies—Part 3", Sep. 2003, High Frequency Electronics, Summit Technical Media, LLC., 9 Pages.
Petri Eloranta, et al., "A Multimode Transmitter in 0.13 μm CMOS Using Direct-Digital RF Modulator", IEEE Journal of Solid-State Circuits, vol. 42, No. 12, Dec. 2007, 11 Pages.
Hur, et al., "Highly Efficient and Linear Level Shifting Digital LINC Transmitter with a Phase Offset Cancellation;" IEEE; Jul. 2009; 4 Pages.
Hur, et al., "A Multi-Level and Multi-Band Class-D CMOS Power Amplifier for the LINC System in the Cognitive Radio Application;" IEEE; Feb. 2010, 3 Pages.
Hur, et al., "Highly Efficient Uneven Multi-Level LINC Transmitter;" Electronics Letter; vol. 45; No. 16; Jul. 30, 2009; 2 Pages.
Image File Wrapper downloaded on Mar. 13, 2013 for U.S. Appl. No. 12/615,696; 427 Pages.
Image File Wrapper downloaded on Mar. 12, 2013 for U.S. Appl. No. 13/106,195; Part 1 of 2; 295 Pages.
Image File Wrapper downloaded on Mar. 12, 2013 for U.S. Appl. No. 13/106,195; Part 2 of 2; 234 Pages.
Image File Wrapper downloaded on Aug. 27, 2015 for U.S. Appl. No. 13/423,909; Part 1 of 4; 353 Pages.
Image File Wrapper downloaded on Aug. 27, 2015 for U.S. Appl. No. 13/423,909; Part 2 of 4; 370 Pages.
Image File Wrapper downloaded on Aug. 27, 2015 for U.S. Appl. No. 13/423,909; Part 3 of 4; 368 Pages.
Image File Wrapper downloaded on Aug. 27, 2015 for U.S. Appl. No. 13/423,909; Part 4 of 4; 73 Pages.
Image File Wrapper downloaded on Aug. 27, 2015 for U.S. Appl. No. 13/798,738; Part 1 of 7; 200 Pages.
Image File Wrapper downloaded on Aug. 27, 2015 for U.S. Appl. No. 13/798,738; Part 2 of 7; 200 Pages.
Image File Wrapper downloaded on Aug. 27, 2015 for U.S. Appl. No. 13/798,738; Part 3 of 7; 200 Pages.
Image File Wrapper downloaded on Aug. 27, 2015 for U.S. Appl. No. 13/798,738; Part 4 of 7; 200 Pages.
Image File Wrapper downloaded on Aug. 27, 2015 for U.S. Appl. No. 13/798,738; Part 5 of 7; 200 Pages.
Image File Wrapper downloaded on Aug. 27, 2015 for U.S. Appl. No. 13/798,738; Part 7 of 7; 200 Pages.
Image File Wrapper downloaded on Aug. 27, 2015 for U.S. Appl. No. 13/798,738; Part 7 of 7; 101 Pages.
Abutbul, et al.; "Step-Up Switching-Mode Converter with High Voltage Gain Using a Switched-Capacitor Circuit;" IEEE Transactions on Circuits and Systems-1: Fundamental Theory and Applications; vol. 50, No. 8; Aug. 2003; pp. 1098-1102.
Axelrod, et al.; "Single-Switch Single-Stage Switched-Capacitor Buck Converter;" $4^{th}$ Nordic Workshop on Power and Industrial Electronics; Jun. 2004; 5 pages.
Giuliano, et al.; "Architectures and Topologies for Power Delivery;" Biannual Review of MIT Center for Integrated Circuits; Power Point Presentation; May 9, 2007; 17 slides.
Ma, et al.; "Design and Optimization on Dynamic Power Systems for Self-Powered Integrated Wireless Sensing Nodes;" Low Power Electronics and Design, 2005; ISLPED 05; Proceedings of the 2005 International Symposium; Aug. 8-10, 2005; pp. 303-306.
Maxim; Triple-Output TFT-LCD DC-DC Converters; MAX1748/MAX8726; 19-3430; Rev 0; Oct. 2004; pp. 1-16.
Ottman, et al.; "Optimized Piezoelectric Energy Harvesting Circuit Using Step-Down Converter in Discontinuous Conduction Mode;" Power Electronics Specialists Conference, 2002; pesc 02. 2002; IEEE $33^{rd}$ Annual; vol. 4; Jun. 23-27, 2002; pp. 1988-1994.
Sun, et al.; "High Power Density, High Efficiency System Two-Stage Power Architecture for Laptop Computers;" $37^{th}$ IEEE Power Electronics Specialists Conference apros; 06; Jun. 18, 2006; 7 pages.
Wood, et al.; "Design, Fabrication and Initial Results of a 2g Autonomous Glider;" Industrial Electronics Society, IECON 2005; $31^{st}$ Annual Conference of IEEE: Nov. 6-10, 2005; pp. 1870-1877.
Xu, et al.; Voltage Divider and its Application in the Two-stage Power Architecture; Applied Power Electronics Conference and Exposition 2006; APEC 06; Twenty-First Annual IEEE: Mar. 19-23, 2006; pp. 499-505.
U.S. Appl. No. 12/437,599.
U.S. Appl. No. 13/487,781.
U.S. Appl. No. 13/599,037.
U.S. Appl. No. 14/251,917.
U.S. Appl. No. 13/011,317.
PCT International Search Report and Written Opinion dated Aug. 28, 2014 for International Application No. PCT/US2014/033267; 10 Pages.
Zhang et al., "Single-Stage Input-Current-Shaping Technique with Voltage-Doubler-Rectifier Front End;" Proceedings of the IEEE Transactions on Power Electronics, vol. 16, No. 1; Jan. 2001; 9 Pages.
U.S. Appl. No. 14/791,685.
Araghchini, et al.; "A Technology Overview of the PowerChip Development Program;" IEEE Transactions on Power Electronics; vol. 28; No. 9; Sep. 2013; pp. 4182-4201.

(56) References Cited

OTHER PUBLICATIONS

Chen, et al.; "Stacked Switched Capacitor Energy Buffer Architecture;" IEEE Transactions on Power Electronics; Vo. 28; No. 11; Nov. 2013; pp. 5183-5195.

Huber, et al.; "Design-Oriented Analysis and Performance Evaluation of Buck PFC Front End;" IEEE Transactions on Power Electronics; vol. 25; No. 1; Jan. 2010; pp. 85-94.

Kjaer, et al.; "Design Optimization of a Single Phase Inverter for Photovoltaic Applications;" Power Electronics Specialist Conference; 2003; PESC 03; IEEE 34th Annual; vol. 3; Jun. 15-19, 2003; pp. 1183-1190.

Krein, et al.; "Cost-Effective Hundred-Year Life for Single Phase Inverters and Rectifiers in Solar and LED Lighting Applications Based on Minimum Capacitance Requirements and a Ripple Power Port;" Applied Power Electronics Conference and Exposition; APEC 2009; Twenty-Fourth Annual IEEE; Feb. 15-19, 2009; pp. 620-625.

Kyritsis, et al.; "A Novel Parallel Active Filter for Current Pulsation Smoothing on Single Stage Grid-Connected AC-PV Modules;" Power Electronics and Applications; 2007 European Conference on; Sep. 2-5, 2007; pp. 1-10.

Kyritsis, et al.; "Enhanced Current Pulsation Smoothing Parallel Active Filter for Single Stage Grid-Connected AC-PV Modules;" International Power Electronics and Motion Control Conference 2008; EPE-PEMC; 2008; 13th; pp. 1287-1292.

Garcia, et al.; "Single Phase Power Factor Correction: A Survey;" IEEE Transactions on Power Electronics; vol. 18; No. 3; May 2003; pp. 749-755.

Lam, et al.; "A Novel High-Power-Factor Single-Switch Electronic Ballast;" IEEE Transactions on Industry Applications; vol. 46; No. 6; Nov./Dec. 2010; pp. 2202-2211.

Lim, et al.; "Power Conversion Architecture for Grid Interface at High Switching Frequency;" Applied Power Electronics Conference and Exposition (APEC); 2014 Twenty-Ninth Annual IEEE: 2014; pp. 1838-1845.

Lim, et al.; "Two-Stage Power Conversion Architecture for an LED Driver Circuit;" Applied Power Electronics Conference and Exposition (APEC); 2013; Twenty-Eighth Annual IEEE; Mar. 17-21, 2013; pp. 854-861.

Perreault, et al.; "Opportunities and Challenges in Very High Frequency Power Conversion;" Applied Power Electronics Conference and Exposition; 2009; APEC 2009; Twenty-Fourth Annual IEEE: Feb. 15-19, 2009; pp. 1-14.

Pierquet, et al.; "A Single-Phase Photovoltaic Inverter Topology With a Series-Connected Energy Buffer;" IEEE Transactions on Power Electronics; vol. 28; No. 10; Oct. 2013; pp. 4603-4611.

Pilawa-Podgurski, et al.; "Merged Two-Stage Power Converter With Soft Charging Switched-Capacitor Stage in 180 nm CMOS;" IEEE Journal of Solid-State Circuits; vol. 47; No. 7; Jul. 2012; pp. 1557-1567.

Schlecht, et al.; "Active Power Factor Correction for Switching Power Supplies;" IEEE Transactions on Power Electronics; vol. PE-2; No. 4; Oct. 1987; pp. 273-281.

Seeman, et al.; "Analysis and Optimization of Switched-Capacitor DC-DC Converters;" IEEE Transactions on Power Electronics; vol. 23; No. 2; Mar. 2008; pp. 841-851.

Shimizu, et al.; "Flyback-Type Single-Phase Utility Interactive Inverter With Power Pulsation Decoupling on the DC Input for an AC Photovoltaic Module System;" IEEE Transactions on Power Electronics; vol. 21; No. 5; Sep. 2006; pp. 1264-1272.

Singh, et al,; "A Review of Single-Phase Improved Power Quality AX-DC Converters;" IEEE Transactions on Industrial Electronics; vol. 50; No. 5; Oct. 2003; pp. 962-981.

Keogh; Power Factor Correction Using the Buck Topology—Efficient Benefits and Practical Design Considerations; Texas Instruments; Reproduced from Texas Instruments Power Supply Design Seminar; SEM1900; Topic 4; TI Literature No. SLUP264; 2010.

Tse, et al.; "A Family of PFC Voltage Regulator Configurations with Reduced Redundant Power Processing;" IEEE Transactions on Power Electronics; vol. 16; No. 6; Nov. 2001; pp. 794-802.

Vorperian; "Quasi-Square-Wave Converters: Topologies and Analysis;" IEEE Transactions on Power Electronics; vol. 3; No. 2; Apr. 11988; pp. 183-191.

Wu, et al.; Design Considerations of Soft-Switched Buck PFC Converter with Constant On-Time (COT) Control; IEEE Transactions on Power Electronics; vol. 26; No. 11; Nov. 2011; pp. 3144-3152.

U.S. Appl. No. 14/934,760, filed Nov. 6, 2015, Briffa, et al.
U.S. Appl. No. 14/920,031, filed Oct. 22, 2015, Briffa, et al.
U.S. Appl. No. 14/968,045, filed Dec. 14, 2015, Perreault et al.
U.S. Appl. No. 14/974,563, filed Dec. 18, 2015, Perreault et al.
U.S. Appl. No. 14/975,742, filed Dec. 19, 2015, Perreault et al.
U.S. Appl. No. 14/837,616, filed Aug. 27, 2015, Briffa, et al.
U.S. Appl. No. 14/823,220, filed Aug. 11, 2015, Barton, et al.

PCT International Search Report and Written Opinion dated Sep. 21, 2015 corresponding to International Application No. PCT/US2015/039197; 8 Pages.

PCT International Preliminary Report on Patentability and Written Opinion of the ISA dated Oct. 22, 2015; For PCT Pat. App. No. PCT/US2014/033267; 9 pages.

U.S. Appl. No. 14/035,445, filed Sep. 24, 2013, Perreault.
U.S. Appl. No. 14/401,981, filed Nov. 18, 2014, Perreault.
U.S. Appl. No. 14/416,654, filed Jan. 23, 2015, Perreault, et al.
U.S. Appl. No. 14/619,737, filed Feb. 11, 2015, Perreault, eta al.
U.S. Appl. No. 14/435,914, filed Apr. 15, 2015, Perreault, et al.
U.S. Appl. No. 14/791,685, filed Jul. 6, 2015, Perreault, et al.
U.S. Appl. No. 15/290,402, filed Oct. 11, 2016, Perreault, et al.
U.S. Appl. No. 15/287,068, filed Oct. 6, 2016, Briffa, et al.
U.S. Appl. No. 15/354,170, filed Nov. 17, 2016, Briffa, et al.

Non-Final Office Action dated Dec. 16, 2016; for U.S. Appl. No. 14/791,685; 34 pages.

Non-Final Office Action dated Jul. 1, 2016; for U.S. Appl. No. 14/708,903; 29 pages.

Response to Office Action dated Jul. 1, 2016 for U.S. Appl. No. 14/708,903, filed Jan. 3, 2017; 10 pages.

PCT International Preliminary Report on Patentability for PCT/US2015/039197 dated Jan. 12, 2017; 7 pages.

Han, et al.; "A New Approach to Reducing Output Ripple in Switched-Capacitor-Based Step-Down DC-DC Converters;" IEEE Transactions on Power Electronics; vol. 21; No. 6; Nov. 2006; 8 pages.

Lei, et al.; "Analysis of Switched-Capacitor DC-DC Converters in Soft-Charging Operation;" 14th IEEE Workshop on Control and Modeling for Power Electronics; Jun. 23, 2013; 7 pages.

Linear Technology Data Sheet for Part LTC3402; "2A, 3MHz Micropower Synchronous Boost Converter;" 2000; 16 pages.

Makowski, et al; "Performance Limits of Switched-Capacitor DC-DC Converters;" IEEE PESC'95; 26th Annual Power Electronics Specialists Conference; vol. 2; Jul. 1995; 7 pages.

Meynard, et al.; "Multi-Level Conversion: High Voltage Choppers and Voltage-Source Inverters;" 23rd Annual IEEE Power Electronics Specialists Conference; Jan. 1992; 7 pages.

Middlebrook; "Transformerless DC-to-DC Converters with Large Conversion Ratios;" IEEE Transactions on Power Electronics; vol. 3; No. 4; Oct. 1988; 5 pages.

Ng; "Switched Capacitor DC-DC Converter: Superior Where the Buck Converter Has Dominated;" PhD Thesis, UC Berkeley; Aug. 17, 2011; 138 pages.

Pilawa-Podgurski, et al.; "Merged Two-Stage Power Converter Architecture with Soft Charging Switched-Capacitor Energy Transfer;" 2008 IEEE Power Electronics Specialists Conference; Jun. 15-19, 2008; 8 pages.

Texas Instruments Data Sheet for Part TPS54310; "3-V to 6-V Input, 3-A Output Synchronous-Buck PWM Switcher with Integrated FETs (SWIFT);" dated Jan. 2005; 19 pages.

Umeno, et al.; "A New Approach to Low Ripple-Noise Switching Converters on the Basis of Switched-Capacitor Converters;" IEEE International Symposium on Circuits and Systems; Jun. 11-14, 1991; 4 pages.

(56) References Cited

OTHER PUBLICATIONS

Notice of Allowance dated Feb. 23, 2017 for U.S. Appl. No. 14/708,903; 20 pages.
Response to Office Action dated Dec. 16, 2016 for U.S. Appl. No. 14/791,685, filed Mar. 9, 2017; 6 pages.

* cited by examiner

METHOD AND APPARATUS TO PROVIDE POWER CONVERSION WITH HIGH POWER FACTOR

RELATED APPLICATIONS

This application is a U.S. National Stage of PCT application PCT/US2014/033267 filed in the English language on Apr. 8, 2014, and entitled "POWER CONSERVATION WITH HIGH POWER FACTOR," which claims the benefit under 35 U.S.C. §119 of provisional application No. 61/809,920 filed Apr. 9, 2013, which application is hereby incorporated herein by reference in its entirety.

STATEMENT REGARDING FEDERALLY SPONSORED RESEARCH

This invention was made with government support under Grant No. DE-AR0000123 awarded by the Department of Energy. The government has certain rights in the invention.

FIELD

The subject matter described herein relates generally to electrical circuits and systems and more particularly to power conversion circuits and systems.

BACKGROUND

The power factor (PF) at the input port of a circuit is a parameter that is related to a ratio between the amount of real power drawn by the circuit (e.g., the average power entering the input port of the circuit) and the amount of apparent power drawn by the circuit (e.g., the product of the root-mean-square, or RMS, voltage at the input port and the RMS current at the input port). In an ac-dc converter, high power factor is generally desired to best convey real power from an alternating current (ac) input to a direct current (dc) output. For example, in a power converter used as a grid interface, a high PF is desired to maintain high power quality. A common technique to achieve high power factor is to cascade a "Power Factor Correction" (PFC) rectifier circuit with a dc-dc converter. The PFC circuit shapes a sinusoidal input current and buffers twice-line-frequency ac power on a capacitor with a certain average dc voltage. The subsequent dc-dc converter then regulates the load voltage from this buffered voltage.

A boost converter is often selected for use in a PFC circuit because of its high power factor capability (about 0.99). However, a boost converter will typically require the use of high-voltage rated switch, diode, and capacitor components (e.g., 2-3 times peak voltage of about 200-400V). Even worse, in the case of a low dc voltage load application, the subsequent dc-dc converter would need a high step-down conversion ratio from the high stepped-up buffered voltage to the low dc voltage. Therefore, high voltage stress will exist on the components of the dc-dc converter, deteriorating the efficiency.

Instead of a boost converter, one alternative for a PFC circuit is a buck converter, which draws a clipped current waveform (i.e., draws current when the input ac voltage magnitude exceeds the dc buffer voltage). Often a clipped-sine current waveform is drawn, yielding a ~0.9-0.95 power factor for typical ac inputs. A benefit of a PFC having a buck topology is the reduced voltage stress and conversion ratio for the corresponding dc-dc converter. However, the active components in the buck PFC circuit still need to be operated directly from the ac line voltage, and thus the buck PFC needs to be designed with high voltage (e.g., 300-600V) active devices. This high voltage requirement also typically results in low achievable switching frequencies and the need for large passive components. Moreover, in both typical boost and buck PFC circuits, the twice-line frequency energy is stored on an output capacitor with small twice-line-frequency voltage ripple, requiring a peak capacitive energy storage rating that is large compared to the amount of twice-line-frequency energy that needs to be buffered. Consequently, PFC circuits with buck converters often display low efficiency and low power density.

New power conversion architectures and methods are needed that are capable of achieving high power factor with one or more of high switching frequency, low component voltage stress, low buffer energy storage requirements, high power density, and/or high efficiency.

SUMMARY

A new power conversion architecture is provided that is capable of achieving high power factor. The power conversion architecture is suitable for use in, for example, grid interface power converters and other power converters where high power factor is an important operating characteristic. The power conversion architecture is capable of providing high power factor while also achieving one or more of high switching frequency, low component voltage stress, low peak buffer energy storage requirement, high power density, and/or high efficiency. The architecture can significantly decrease the voltage stress of the active and passive devices within the converter, thus enabling high-frequency operation and small size. Moreover good power factor can be achieved while dynamically buffering twice-line-frequency energy with relatively small capacitors. In some implementations, an ac-dc power converter architecture is provided that is suitable for use as a single-phase grid interface at high switching frequency (e.g., above 3 MHz). Features, concepts, and circuits described herein may also be used to provide bi-directional power converter circuits and dc-ac circuits.

A prototype power converter was developed for use in light emitting diode (LED) driver operations. Testing has shown that the prototype implementation achieves an efficiency of 93.3% and a power factor of 0.89, while maintaining high frequency operation and small size (with a displacement power density of 130 W/in$^3$). As will be described in greater detail, the circuits, systems, concepts, and features described herein can be used to provide power converters with different regulating and combining converter topologies, and can likewise be adapted to the requirements of a variety of different applications, voltage ranges and power levels.

In accordance with one aspect of the concepts, systems, circuits, and techniques described herein, a power converter circuit comprises: a line frequency rectifier circuit configured to rectify an alternating current (ac) input voltage of the power converter circuit; a stack of capacitors to receive an output signal of the line frequency rectifier circuit, the stack of capacitors having at least two stacked capacitors; a set of regulating converters coupled to the stack of capacitors, each regulating converter in the set of regulating converters being configured to draw current from a corresponding one of the stacked capacitors and to generate a regulated voltage at an output thereof in response thereto; a power combining converter circuit configured to combine the output signals of the set of regulating converters and to convert the combined signal to a desired direct current (dc) output voltage; and a controller configured to controllably modulate the input current of one or more of the regulating converters in a manner that enhances power factor in the power converter circuit.

In some embodiments, the controller is configured to controllably modulate the input currents of the regulating converters in a manner that regulates the voltage or current at one or outputs of the regulating converters and/or at one or more system outputs.

In some embodiments, the controller is configured to controllably modulate the input currents of the regulating converters in a manner that results in a power factor in the power converter circuit that is greater than or equal to 0.8.

In some embodiments, the controller is configured to controllably modulate the input current of all of the regulating converters in the set in a manner that enhances power factor in the power converter circuit.

In some embodiments, the set of regulating converters includes at least one inverted resonant-transition buck converter.

In some embodiments, the set of regulating converters includes at least one inverted resonant-transition buck converter.

In some embodiments, the set of regulating converters includes at least one flyback converter.

In some embodiments, the power combining converter circuit includes a switched capacitor circuit.

In some embodiments, the power combining converter circuit includes an interleaved switched capacitor circuit.

In some embodiments, the power combining converter circuit includes an indirect dc-dc converter topology.

In some embodiments, the power combining converter circuit includes a buck-boost converter.

In some embodiments, the power combining converter circuit includes a multi-winding flyback converter.

In some embodiments, the power combining converter circuit is configured to combine the outputs of the regulating converters to a single output.

In some embodiments, the stack of capacitors has three or more stacked capacitors and the set of regulating converters has one converter for each of the three or more stacked capacitors.

In some embodiments, the controller is configured to adapt a quantity of capacitors and regulating converters that are operative at a particular time based on a predetermined criterion.

In some embodiments, the controller is configured to adapt a quantity of capacitors and regulating converters that are operative at a particular time based on a line voltage currently being used.

In some embodiments, the sum of the voltages across the capacitors of the stack of capacitors is substantially equal to the output voltage of the line frequency rectifier.

In accordance with another aspect of the concepts, systems, circuits, and techniques described herein, a machine implemented method of operating a power converter circuit comprises: rectifying an alternating current (ac) line voltage; applying the rectified ac line voltage across a stack of capacitors, the stack of capacitors having at least two stacked capacitors; for each of the capacitors in the stack of capacitors, applying a corresponding voltage to an input of a corresponding regulating converter to convert the voltage to a regulated output signal for each of the regulating converters; modulating an input current of one or more of the regulating converters in a manner that increases power factor of the power converter circuit; and combining the regulated output signals of the regulating converters to generate a combined signal that is a desired direct current (dc) output voltage.

In some embodiments, combining the regulated output signals of the regulating converters to generate a combined signal includes providing electrical isolation between the regulated output signals and the combined signal.

In some embodiments, rectifying an ac line voltage includes full-wave rectifying the ac line voltage.

In some embodiments, the method further comprises adapting the number of capacitors in the stack of capacitors that are active based on a predetermined criterion.

In some embodiments, the method further comprises adapting the number of capacitances in the stack of capacitors that are active based on a line voltage level currently being used.

In some embodiments, modulating an input current of one or more of the regulating converters includes modulating input currents of all regulating converters that are currently active.

BRIEF DESCRIPTION OF THE DRAWINGS

The foregoing features may be more fully understood from the following description of the drawings in which.

DETAILED DESCRIPTION

Figure 1:
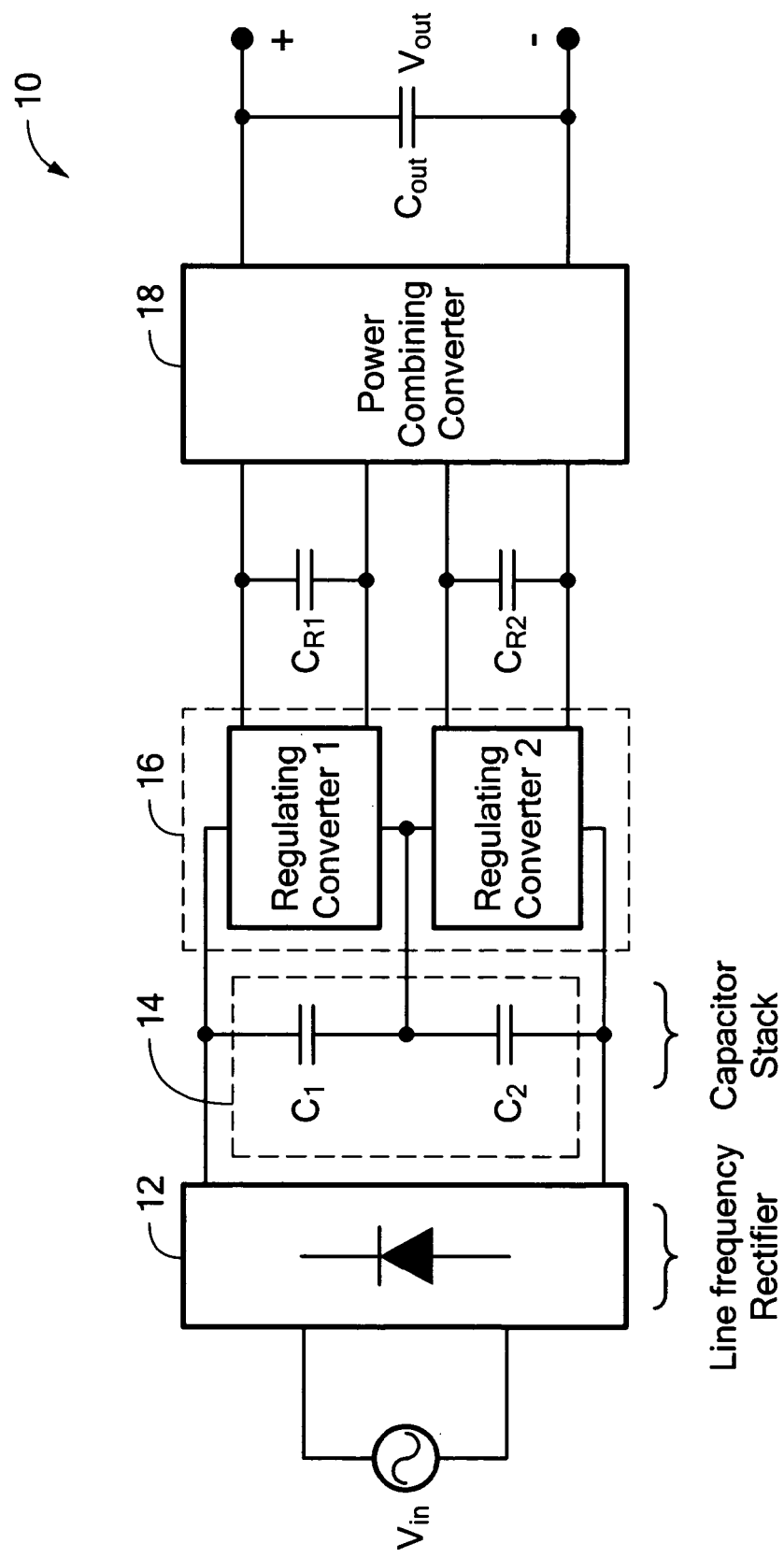
FIG. 1 is a schematic diagram illustrating an example grid interface power converter architecture in accordance with an embodiment.

FIG. 1 is a schematic diagram illustrating an example grid interface power converter architecture 10 in accordance with an embodiment. As shown, the grid interface power converter architecture 10 is characterized by a line-frequency rectifier 12, a stack of capacitors 14, a set of regulating converters 16, and a power-combining converter 18 (or a set of power combining converters). The line-frequency rectifier 12 has an input that is coupled to a grid voltage (Vin) and an output that is coupled to the stack of capacitors 14. The line-frequency rectifier 12 rectifies the grid voltage to generate a DC voltage at the output. In at least one implementation, the line-frequency rectifier 12 includes a full-bridge diode rectifier, although other rectifier configurations (such as synchronous full bridge rectifier, semi-bridge rectifier, voltage-doubler rectifier, switchable voltage-doubler/full-bridge rectifier, valley-fill rectifier) can alternatively be used. The total voltage across the capacitor stack 14 is equal to the rectifier output voltage. The capacitor stack 14 provides a portion of (or all of) any needed twice-line-frequency energy buffering, such that the power converter can provide high power factor. One or more of the capacitors in the capacitor stack 14 may have a voltage that varies over a wide range as the line voltage varies over the line cycle. One or more of the capacitors in the capacitor stack 14 may have larger value(s) than the other(s), and buffer a larger portion of the twice-line-frequency energy. The rectifier input current waveform may approximate a clipped sine wave (or, may be a different current waveform providing a desired power factor and/or instantaneous power processing), and the total capacitor stack voltage may closely follow the amplitude of the line voltage over a portion of the line cycle.

Although described above and in other places herein as a "stack of capacitors" or a "capacitor stack," it should be appreciated that any one or more of the capacitors in the depicted "stack" can be implemented using multiple capacitors that are interconnected in a particular manner to achieve a single effective capacitance value. Thus, as used herein, the phrases "stack of capacitors" and "capacitor stack" are intended to mean a stack of capacitors where each "capacitor" may be associated with a single capacitor (as in FIG. 1) or multiple interconnected capacitors, or multiple capacitors interconnected by switches.

The set of regulating converters 16 have their inputs coupled to the capacitors of the capacitor stack 14 and provide regulated output voltages based thereon. The currents drawn by the regulating converters are modulated to draw energy from the capacitors, such that the currents drawn from the capacitor stack result in an input current waveform to the rectifier that provides high power factor while achieving the total needed energy transfer. In some embodiments described herein, the regulating converters 16 may be implemented as resonant-transition discontinuous-mode inverted buck converters. This topology enables high-frequency (HF) or very-high-frequency (VHF) operation of the regulating converters with high efficiency, low device voltage stress, small component size, and good control capability. Other types of regulating converters may alternatively be used.

The power-combining converter 18 has a plurality of inputs coupled to the regulating converter outputs. The power-combining converter 18 draws energy from the regulating converter outputs and delivers the combined power to the converter system output. The power-combining converter 18 may provide one or more of: voltage balancing among the regulating converter outputs, isolation, voltage transformation, and additional regulation of the output. The power-combining converter 18 may be a regulating or non-regulating converter structure, and may be optionally implemented as, for example, a switched capacitor circuit, a multi-input isolated converter, or as a set of single-input converters which each receive a corresponding regulating converter output and collectively supply a single power combining converter output. Other power combining converter configurations may alternatively be used.

Before introducing specific circuit topology examples for the regulating converters and the power combining converter(s), a mathematical description of steady state circuit behavior and how high power factor is achieved will be made.

Figure 2:
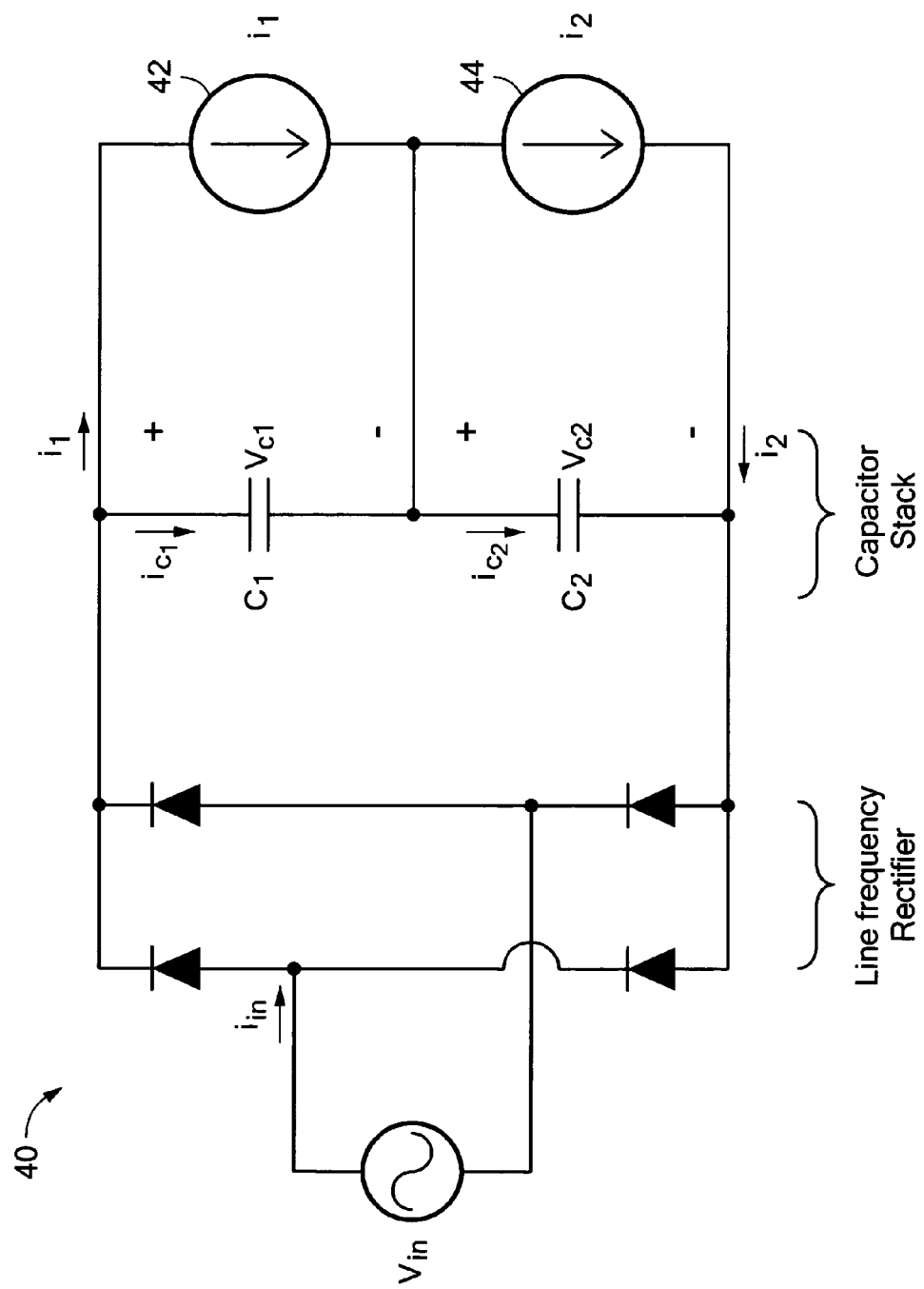
FIG. 2 is a schematic diagram illustrating a simplified circuit model of the front end of the grid interface power converter architecture of FIG. 1 in accordance with an embodiment.
Figure 3:
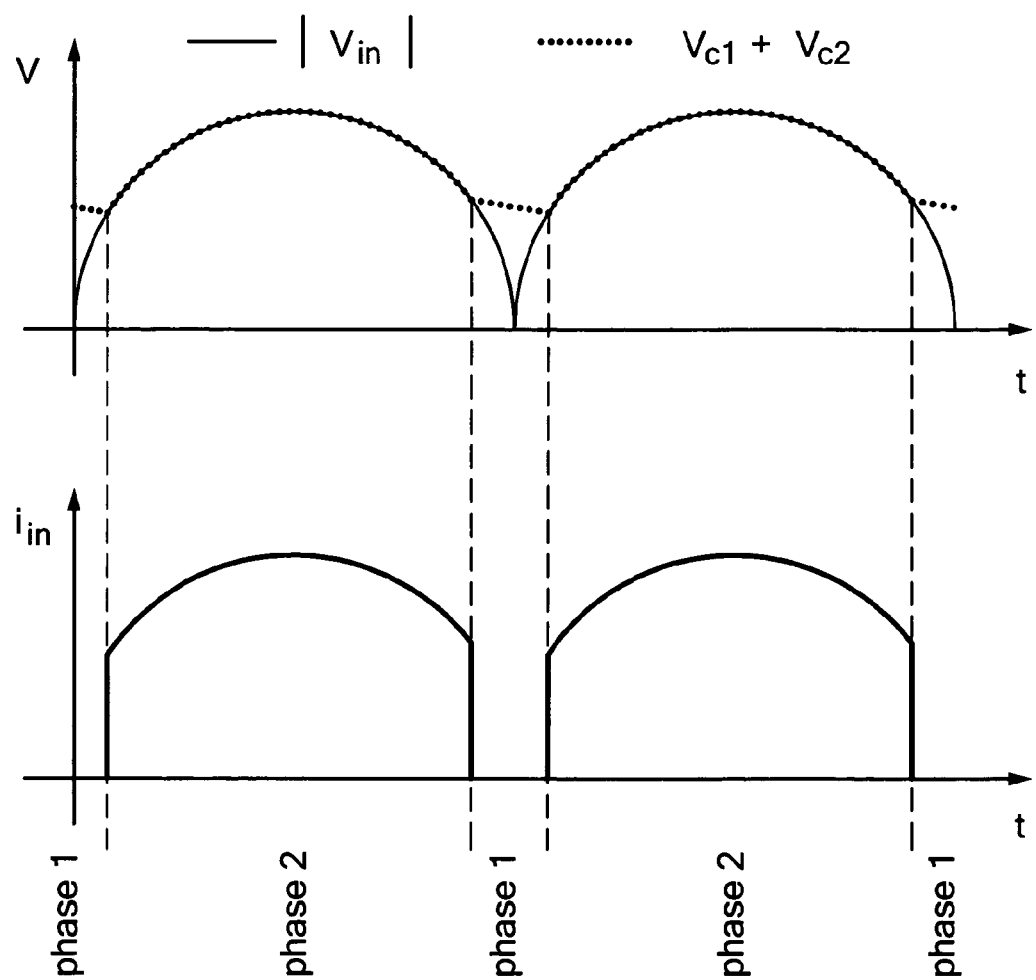
FIG. 3 are waveform diagrams illustrating the two-phase nature of capacitor stack voltage and rectifier input current in accordance with an embodiment.

FIG. 2 is a simplified circuit model 40 of the front end of the grid interface power converter architecture 10 of FIG. 1. In the model 40 of FIG. 2, two current sources 42, 44 model the average current drawn by the regulating converters (e.g., average over a switching period). The circuit cycles in two phases across a half line cycle, as shown in the FIG. 3. During phase 1, the input ac voltage is lower than the total voltage of the stacked capacitors and the full-bridge rectifier is off. During this phase, capacitors $C_1$ and $C_2$ are discharged by the regulating converters and the voltage across the capacitor stack decreases. When the input ac voltage amplitude starts to exceed the total voltage of stacked capacitors, the full-bridge turns on and the circuit enters phase 2. During phase 2, the capacitor stack voltage tracks the rectified input AC voltage, and the input current follows the sum of the currents into $C_1$ and regulating converter 1, as well as $C_2$ and regulating converter 2. When the total capacitor stack voltage discharges slowly enough by the regulating convertors that it does not follow the decreasing envelope of the ac input voltage, the total capacitor stack voltage becomes higher than the rectified ac voltage. The full-bridge then turns off and the circuit repeats the cycle starting phase 1 (see $V_{C1}+V_{C2}$ in FIG. 3).

Considering continuous current draw from the regulating converters (e.g. local average over a switching cycle of the regulating converters), the mathematical expressions for each phase are as follows:

phase 1—full-bridge is off and conducts zero input current $$i_{C1}(t) = C_1 \frac{dv_{c1}(t)}{dt} = -i_1(t) \quad v_{C1}(t) = V_{c1,i} \int \frac{i_1(t)}{C_1} d(t) \tag{1}$$

$$i_{C2}(t) = C_2 \frac{dv_{c2}(t)}{dt} = -i_2(t) \quad v_{C2}(t) = V_{c2,i} \int \frac{i_2(t)}{C_2} d(t) \tag{2}$$

$$P_0(t) = v_{C1}(t)i_1(t) + v_{C2}(t)i_2(t) \tag{3}$$

phase 2—full-bridge is on and conducts $i_{in}(t)$ input current $$v_{in}(t) = V\sin\omega t = v_{C1}(t) + v_{C2}(t) \tag{4}$$

$$i_{in}(t) = i_{C1}(t) + i_1(t) = i_{C2}(t) + i_2(t) \tag{5}$$

$$P_0(t) = v_{C1}(t)i_1(t) + v_{C2}(t)i_2(t) \tag{6}$$

$$i_{C1}(t) = C_1 \frac{dv_{c1}(t)}{dt} \quad v_{C1}(t) = V_{c1,i} - \int \frac{i_1(t)}{C_1} d(t) \tag{7}$$

$$i_{C2}(t) = C_2 \frac{dv_{c2}(t)}{dt} \quad v_{C2}(t) = V_{c2,i} - \int \frac{i_2(t)}{C_2} d(t) \tag{8}$$

$$i_1(t) = \frac{1}{\frac{1}{C_1} - \frac{1v_{c1}(t)}{C_2 v_{c1}(t)}} \left\{ \left( \frac{1}{C_1} + \frac{1}{C_2} \right) i_{in}(t) - \omega V \cos \omega t - \frac{P_0(t)}{C_2 v_2} \right\} \tag{9}$$

$$i_2(t) = \frac{1}{v_{c2}(t)}(P_0(t) - v_{c1}(t)i_1(t)) \tag{10}$$

where $i_{C1}(t)$ and $i_{C2}(t)$ are the instantaneous currents through $C_1$ and $C_2$, respectively; $v_{C1}(t)$ and $v_{C2}(t)$ are the instantaneous voltages across $C_1$ and $C_2$, respectively; $i_1(t)$ and $i_2(t)$ are the currents associated with current sources 42, 44, respectively; $P_0$ is the output power of the simplified circuit model; and $V_{c1,i}$ and $V_{c2,i}$ are the initial values of $v_{C1}(t)$ and $v_{C2}(t)$, respectively.

Equations 9 and 10 above (which are derived from the Equations 4-8) show the currents $i_1$ and $i_2$ during phase 2 (i.e., the average current through the regulating converters 1 and 2). These equations for phase 2 show that a certain shape of input current is achieved through proper $i_1$ and $i_2$ current modulation across the line cycle. It should also be noted that the currents $i_1$ and $i_2$ are related to the instantaneous voltages across the capacitors $C_1$ and $C_2$, respectively.

Small time step numerical simulations executed over the line cycle with initial values verified the steady-state energy delivery and high power factor capability of the proposed system. The numerical simulation results, which were based on the equations above, demonstrate the effectiveness of the proposed system. In the simulation, ideal power combining may be assumed (i.e., 100% efficiency of the power combining converter). For certain capacitance values for the stack capacitors $C_1$ and $C_2$ and a given power level, there are some proper $i_1$ and $i_2$ current combinations over the line cycle that enable steady state operation with high power factor. Because there is a relationship between capacitor stack size, power level, capacitor stack voltage ripple, regulating converter voltage stress, and power factor, setting desired operating points and choosing proper regulating circuit topology are essential. The examples below briefly illustrate how the current of each regulating converter may be modulated, how the capacitor stack voltage varies, and the shape of the input current under certain requirements. In these examples, the stack capacitor values are selected as $C_1=1$ µF and $C_2=50$ µF among various sets of other parameter values.

Example 1

$C_1=1$ µF, $C_2=50$ µF, Pout=30 W, and $i_{in}$=Clipped-Sinusoid

Figure 4:
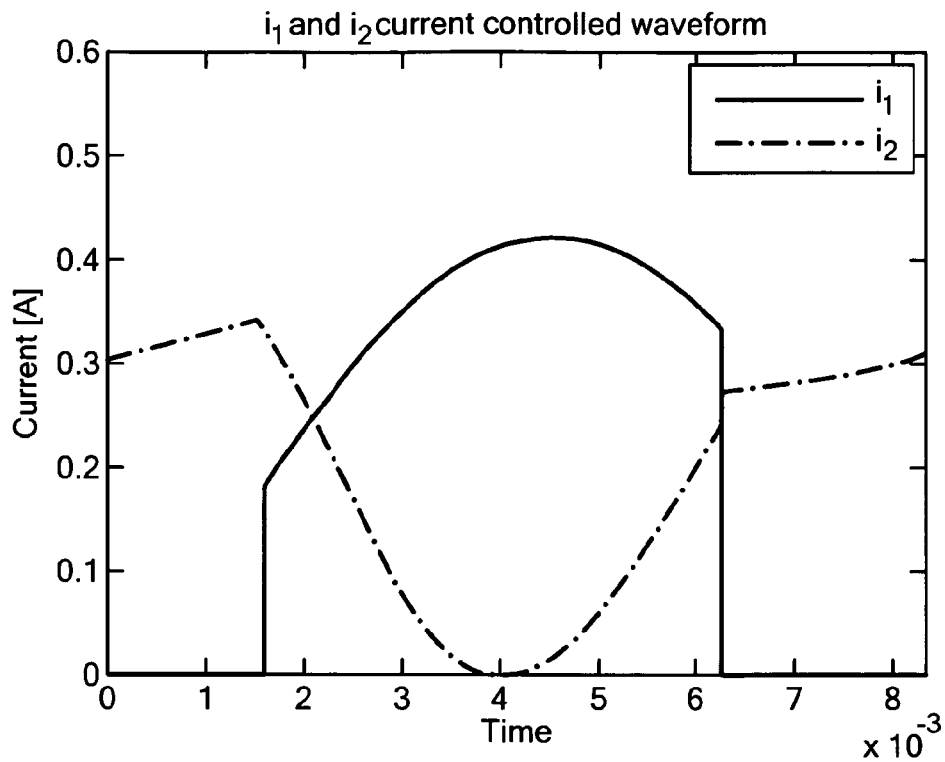
FIGS. 4, 5, 6, and 7 are waveform diagrams illustrating various current and voltage waveforms associated with a power converter circuit operating with input current modulated as a clipped sinusoid and with $C_1=1$ µF, $C_2=50$ µF, $P_{out}=30$ W, $V_{c1,i}=10$ volts, and $V_{c2,i}=97$ volts (Example 1)
Figure 5:
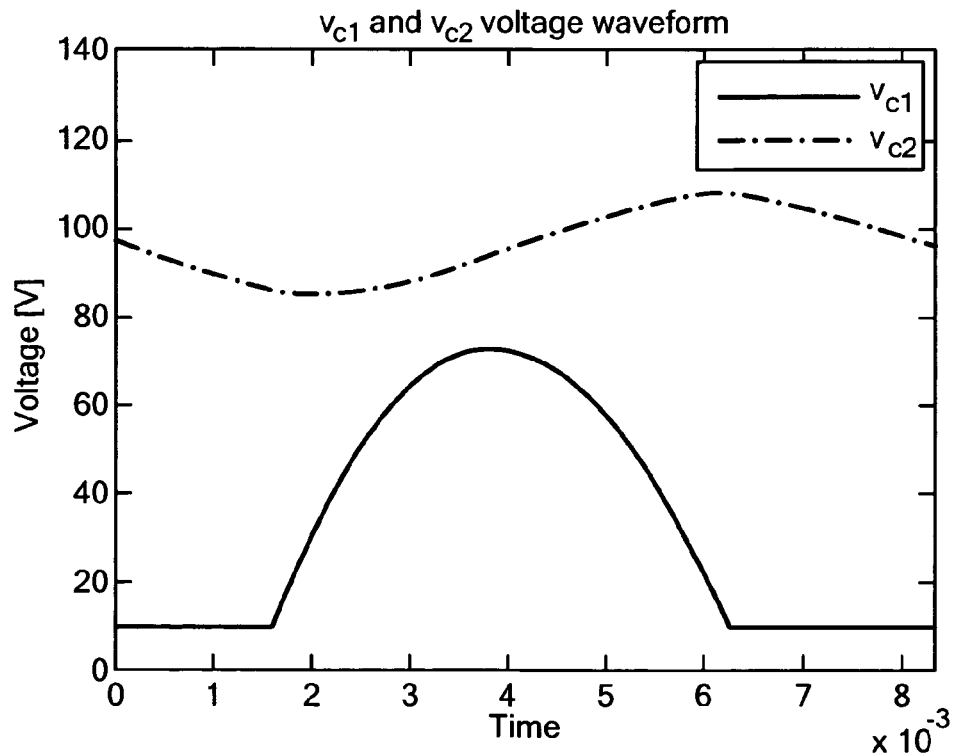
Figure 6:
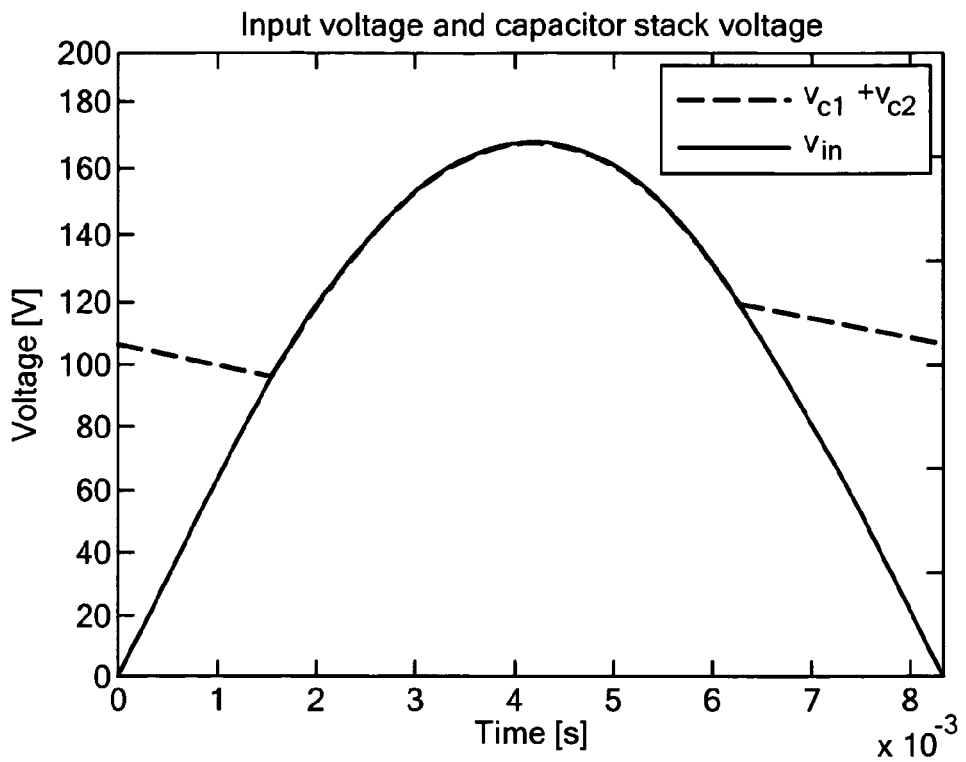
Figure 7:
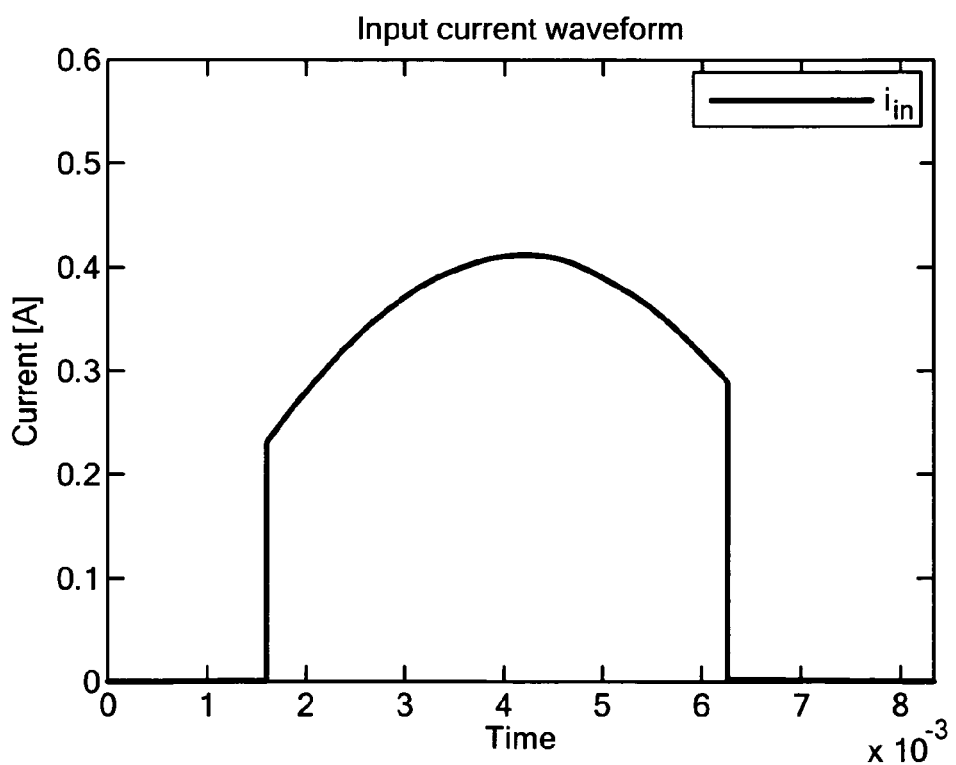
Figure 8:
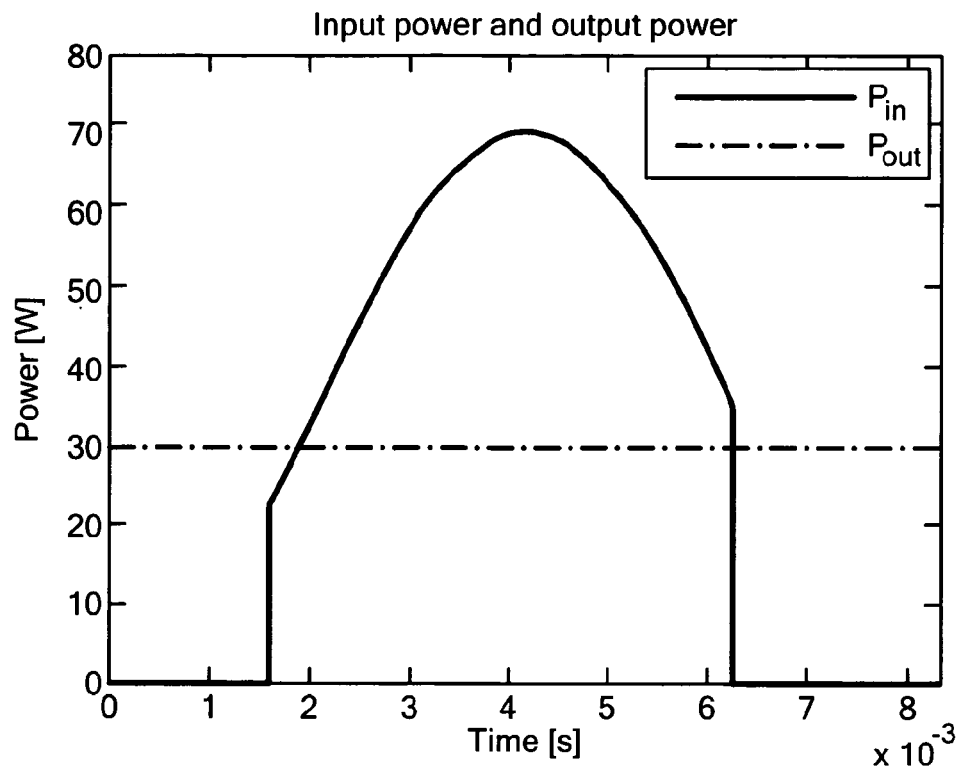
FIG. 8 is a diagram illustrating the input power and the output power associated with the power converter circuit operating in accordance with Example 1.

FIGS. 4, 5, 6, and 7 show the current and voltage waveforms of the model 40 of FIG. 2 when $C_1=1$ µF, $C_2=50$ µF, $P_{out}=30$ W, $V_{c1,i}=10$ volts, and $V_{c2,i}=97$ volts. The initial voltage of each capacitor is decided by predefined calculation or by internal feedback control circuitry. A sinusoidal input voltage of $170V_{pk}$ is assumed. First of all, to achieve high power factor an ideal sinusoidal current waveform is desired when the full-bridge conducts. Currents $i_1(t)$ and $i_2(t)$ are calculated and modulated to achieve this using equations 9 and 10. The simulation shows that with the current modulation of each regulating converter, as shown in FIG. 4, the voltages across the capacitors $C_1$ and $C_2$ vary as shown in FIG. 5. It should be noted that the capacitor stack buffers twice-line-frequency energy and both of the capacitors $C_1$ and $C_2$ maintain steady-state operation over the line cycle (i.e., the capacitor stack voltage is the same at the beginning and end of the line cycle). As described above, the full-bridge rectifier turns on and off over the line cycle. FIG. 6 illustrates the capacitor stack voltage waveform and the input voltage ($v_{in}$) waveform. FIG. 7 shows the actual clipped sinusoidal input current waveform at the rectifier input. As a result, the variations in power drawn from the line voltage are totally buffered by the stacked capacitors and the regulating converters, and the total output power of the two regulating converters is constant, as shown in FIG. 8. From this simulation, it is shown that reasonably high power factor (i.e., around 0.93) can be achieved.

Example 2

$C_1=1$ µF, $C_2=50$ µF, Pout=30 W, $35 \le v_{c1}(t)$, $v_{c2}(t) \le 100$, and $i_{in}$=Clipped-Sinusoid In this example, additional current control considerations are made when several restrictions are required from the regulating converter topology. First of all, it is supposed that the regulating converter to be used is only operable across a 35-100V input voltage range and only delivers power in one direction (i.e., power always flows from the capacitor stack to the power combining circuit and the regulating converter cannot draw negative current from the input). In this circumstance, modulating the current and operating the regulating converter as described in the first example above is not allowed because of the wide-range variation of $v_{c1}$ from FIG. 5 (i.e., $v_{c1}$ varies 10-80V, which is too wide a range for regulating converter 1 to operate).

Figure 9:
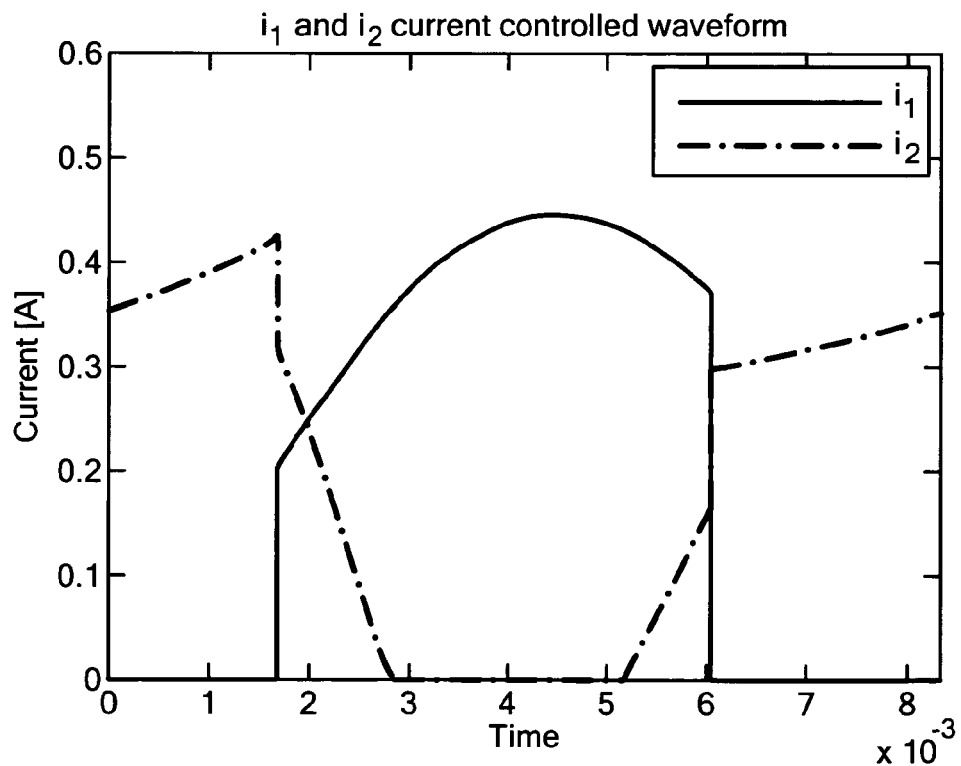
FIGS. 9, 10, 11, and 12 are waveform diagrams illustrating various current and voltage waveforms associated with a power converter circuit operating with input current modulated as a clipped sinusoid and with $C_1=1$ µF, $C_2=50$ µF, $P_{out}=30$ W, $V_{c1,i}=35$ volts, and $V_{c2,i}=81$ volts (Example 2)
Figure 10:
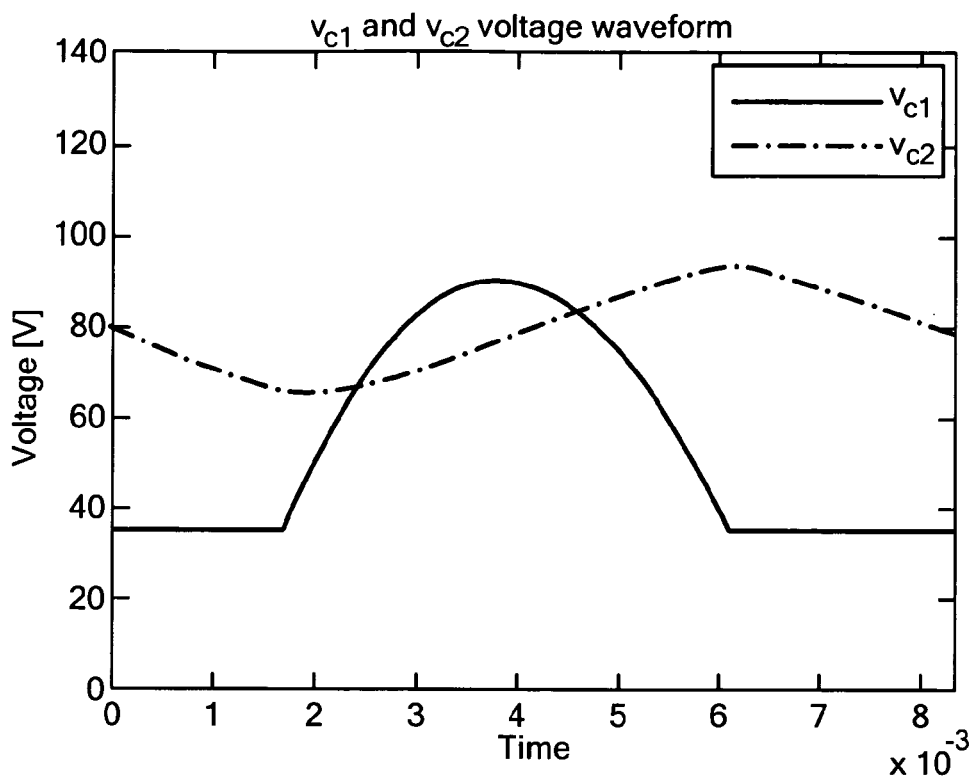
Figure 11:
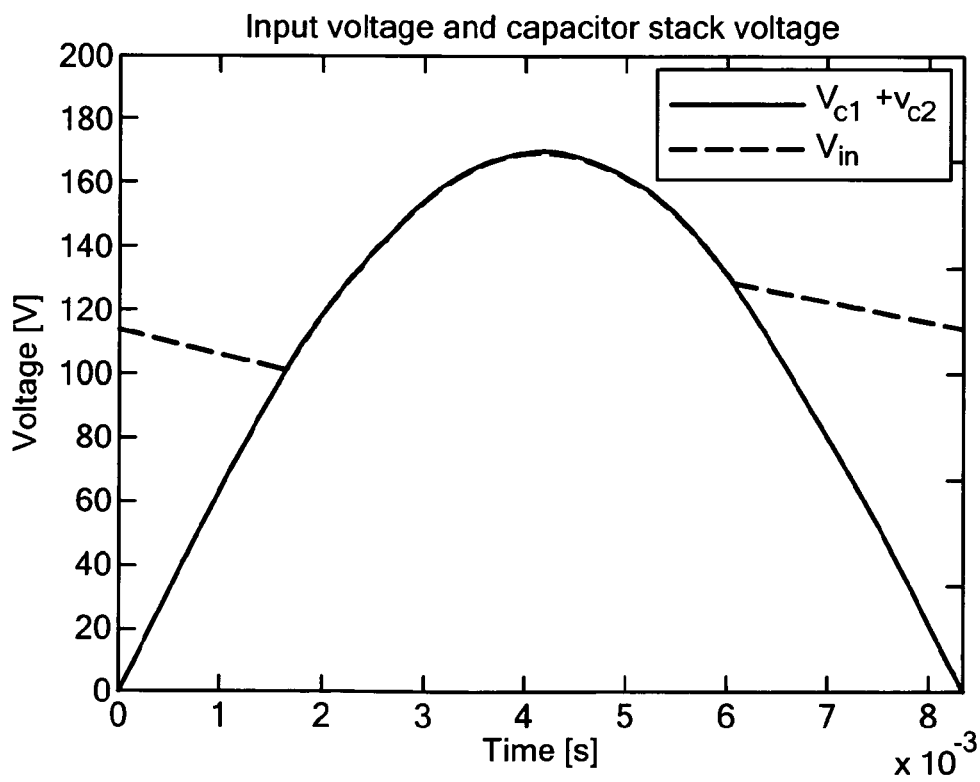
Figure 12:
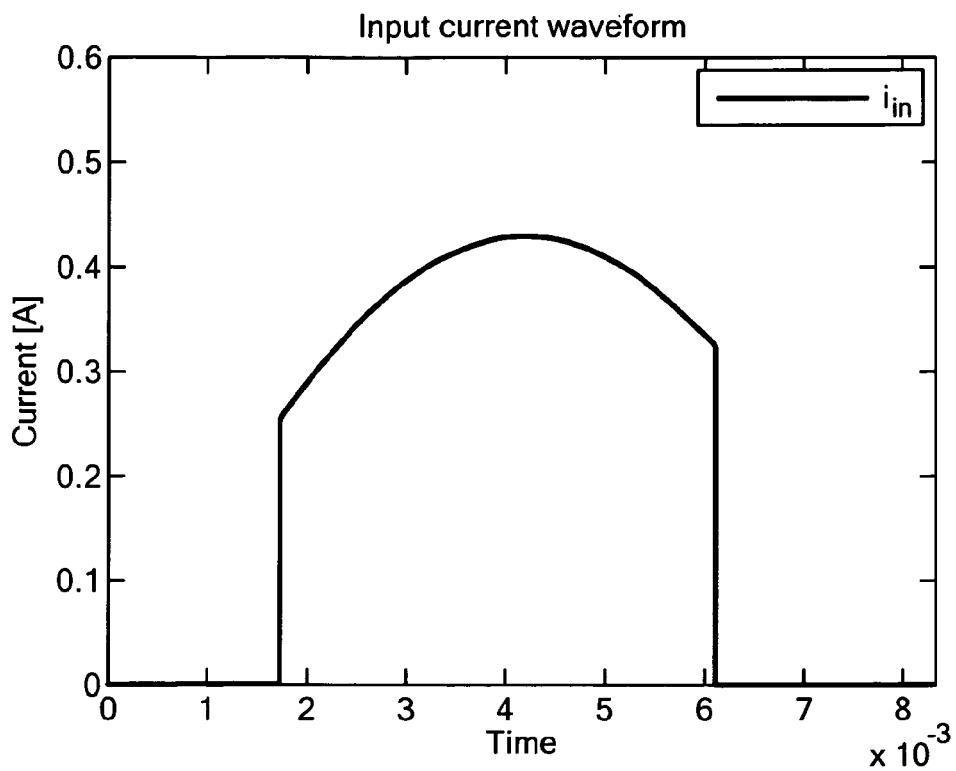

FIGS. 9, 10, 11, and 12 illustrate the current and voltage waveforms satisfying the regulating converter requirements with $C_1=1$ µF, $C_2=50$ µF, $P_{out}=30$ W, $V_{c1,i}=35$ volts, and $V_{c2,i}=81$ volts. In this scenario, the calculated $i_2$ current would ideally go negative, requiring bidirectional power flow from the regulating converter. However, it is assumed here that $i_2$ should be kept positive due to the regulating converter requirements. Hence, as shown in FIG. 9, the modulating current $i_2$ is assigned to sit at the zero current level instead, and the resulting voltage and current waveforms are plotted as shown in FIGS. 10, 11, and 12.

As shown in FIG. 12, the input current waveform does not resemble an ideal clipped sine wave, due to the positive-clipped $i_2$ current waveform (i.e., the input current waveform has a small deviation from an ideal clipped sinusoidal waveform when current $i_2$ sits at zero). This deviation, however, has only a small effect on the clipped sinusoidal waveform shape, and thus reasonably high power factor of about 0.91 is achieved in this example.

Figure 13:
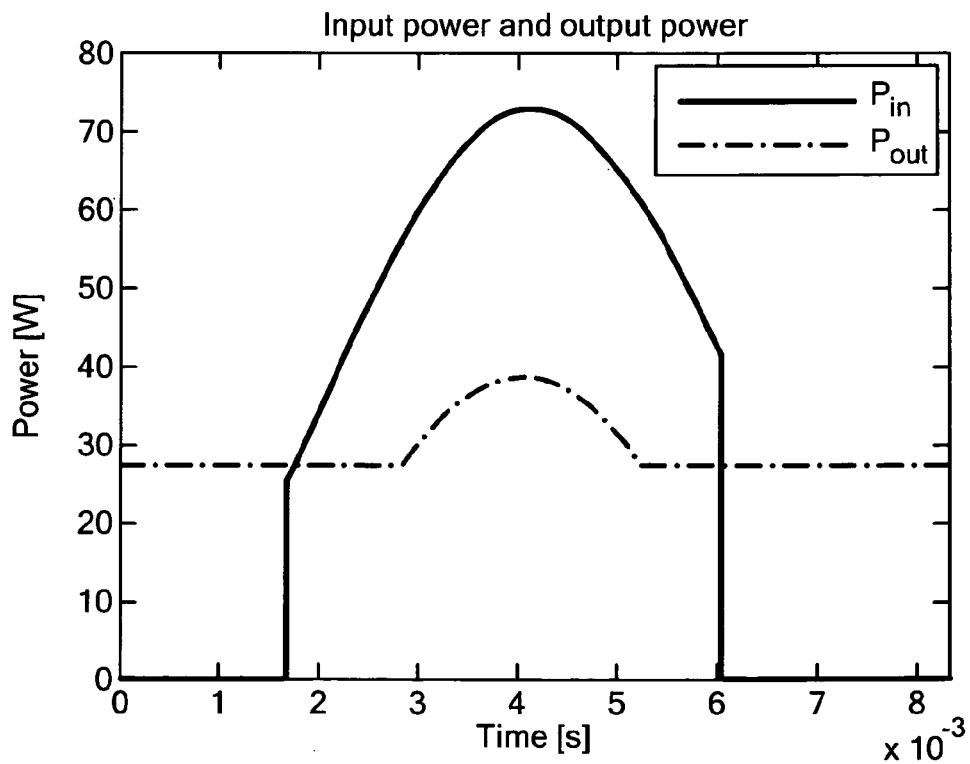
FIG. 13 is a diagram illustrating the input power and the output power associated with the power converter circuit operating in accordance with Example 2.
Figure 14:
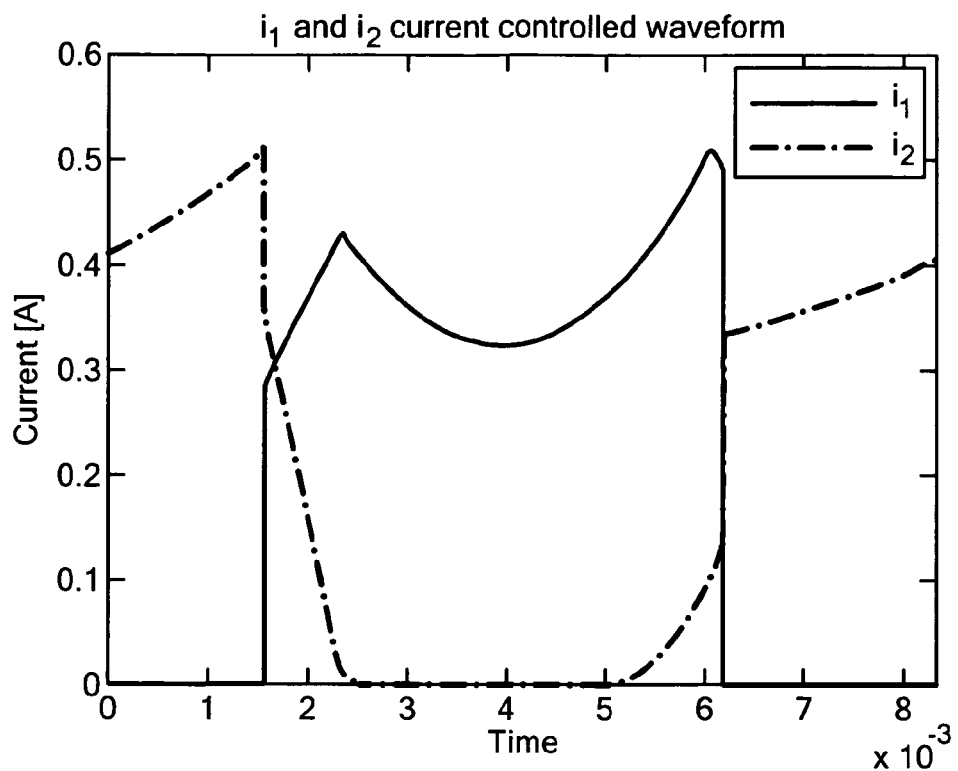
FIGS. 14, 15, 16, and 17 are waveform diagrams illustrating various current and voltage waveforms associated with a power converter circuit operating with input current modulated as a folded clipped sinusoid and with $C_1=1$ µF, $C_2=50$ µF, $P_{out}=30$ W, $V_{c1,i}=35$ volts, and $V_{c2,i}=73$ volts (Example 3)
Figure 15:
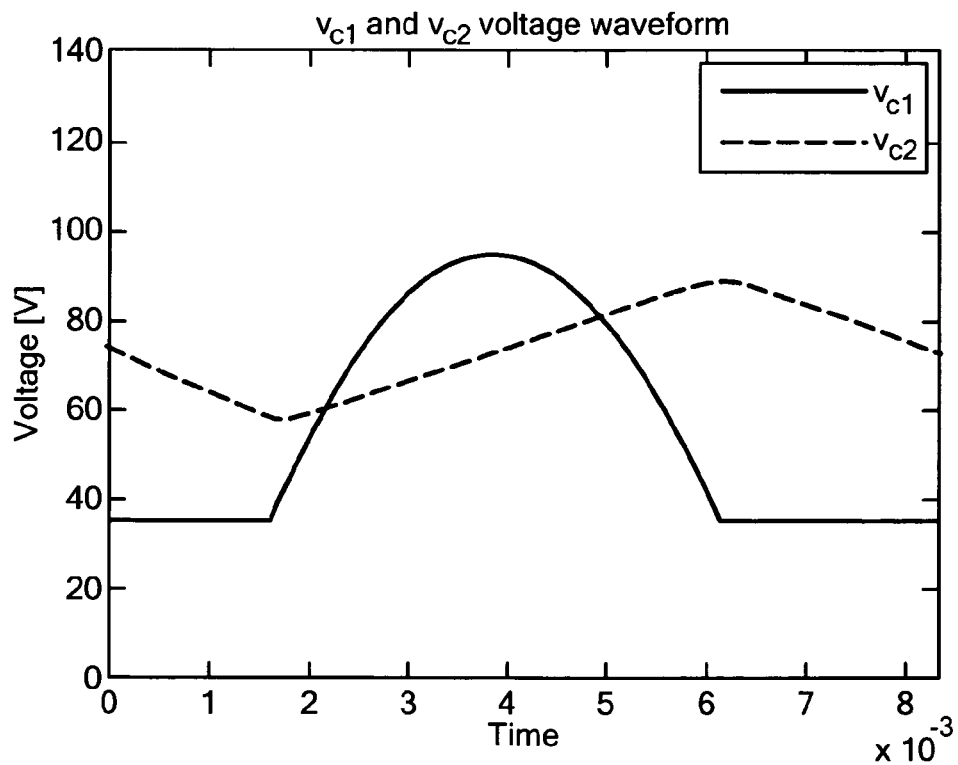
Figure 16:
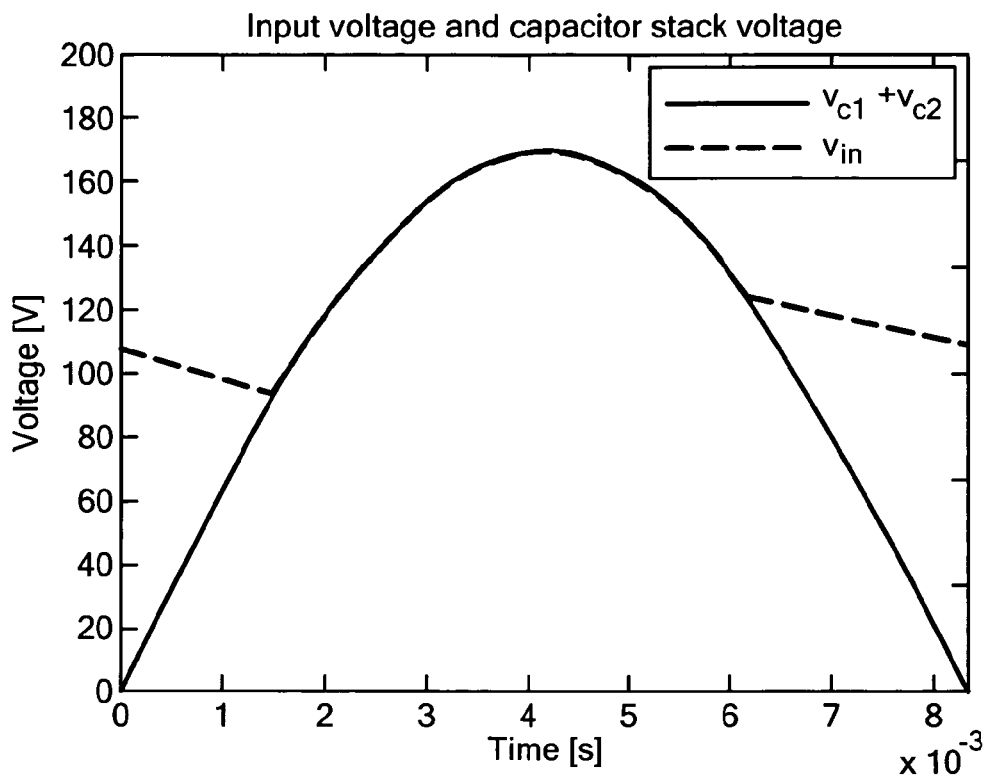

It should be noted that because of the positive-clipped $i_2$ current modulation, the whole AC input energy is not buffered thoroughly in the capacitor stack, as shown in FIG. 13. To convey fixed power to the system output, the residual ac ripple energy of Pout should be buffered either at the output capacitors of the regulating converters or at the system output capacitor. Since the amount of this ac ripple energy is greatly reduced in comparison to the ac input energy, a small additional capacitance can be used for this further buffering.

Example 3

Figure 17:
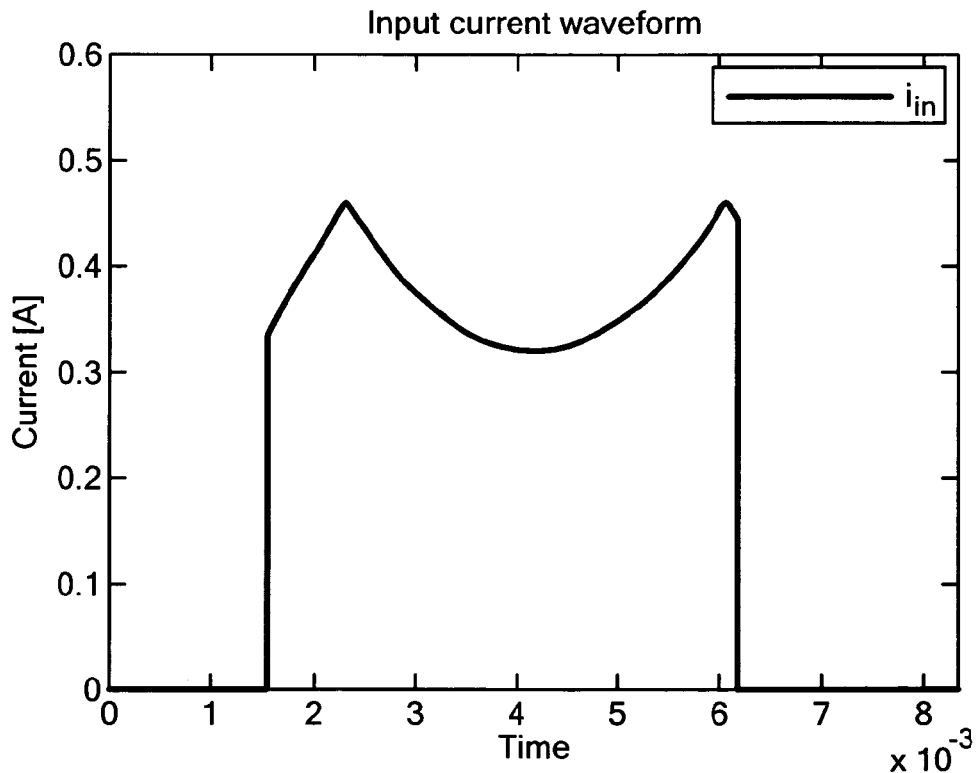

$C_1=1$ µF, $C_2=50$ µF, Pout=30 W, $35 \leq v_{c1}(t)$, $v_{c2}(t) \leq 100$, and $i_{in}$=Folded-Clipped-Sinusoid This example proposes another shape of the input current waveform to achieve high power factor and ac (twice line frequency) power buffering. The capacitor stack values ($C_1=1$ µF and $C_2=50$ µF) and power level are the same as the previous example. However, instead of a clipped sinusoidal input current, a folded-clipped sinusoidal input current waveform is assumed (i.e., as shown in FIG. 17, the input current waveform is folded backward above a specific current level). In addition, $V_{c1,i}=35$ volts and $V_{c2,i}=73$ volts are used. FIGS. 14, 15, 16, and 17 illustrate the resulting $i_1$ and $i_2$ current waveforms and the voltage waveforms across each capacitor stack.

Figure 18:
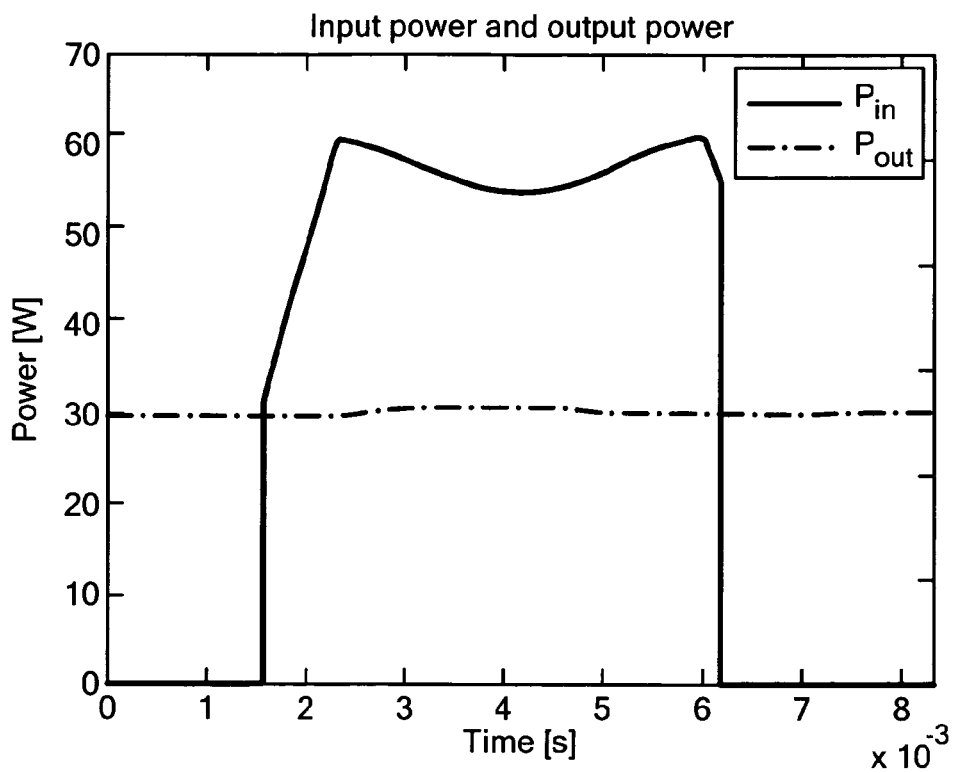
FIG. 18 is a diagram illustrating the input power and the output power associated with the power converter circuit operating in accordance with Example 3.
Figure 19:
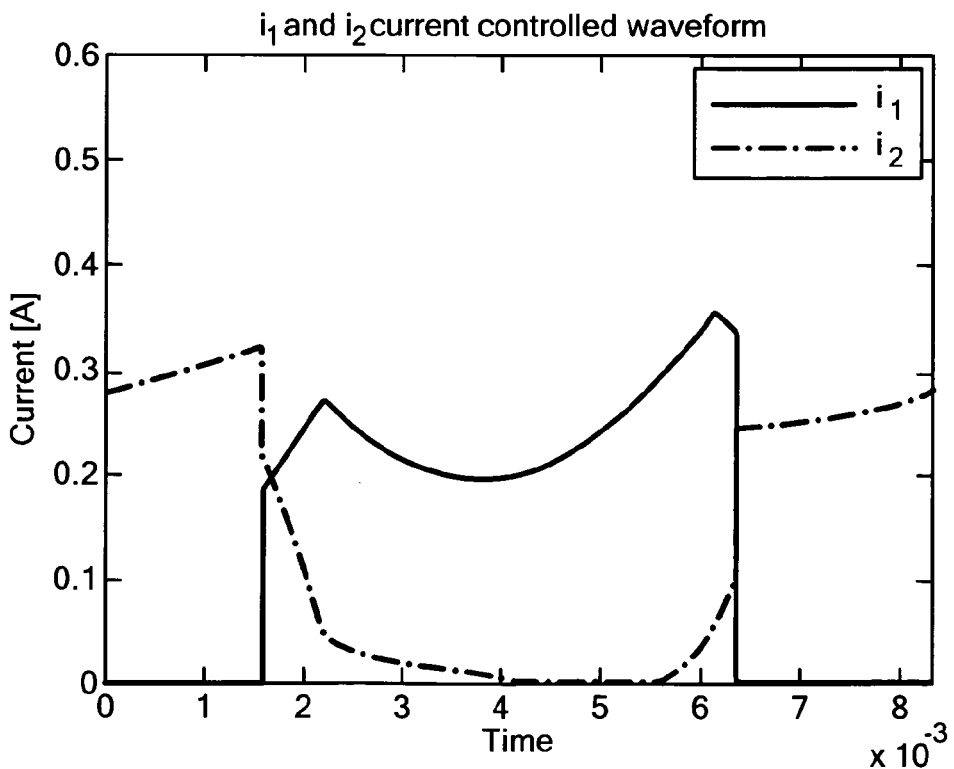
FIGS. 19, 20, 21, and 22 are waveform diagrams illustrating various current and voltage waveforms associated with a power converter circuit operating with input current modulated as a folded clipped sinusoid and with $C_1=1$ µF, $C_2=50$ µF, $P_{out}=20$ W, $V_{c1,i}=35$ volts, and $V_{c2,i}=71$ volts (Example 4)
Figure 20:
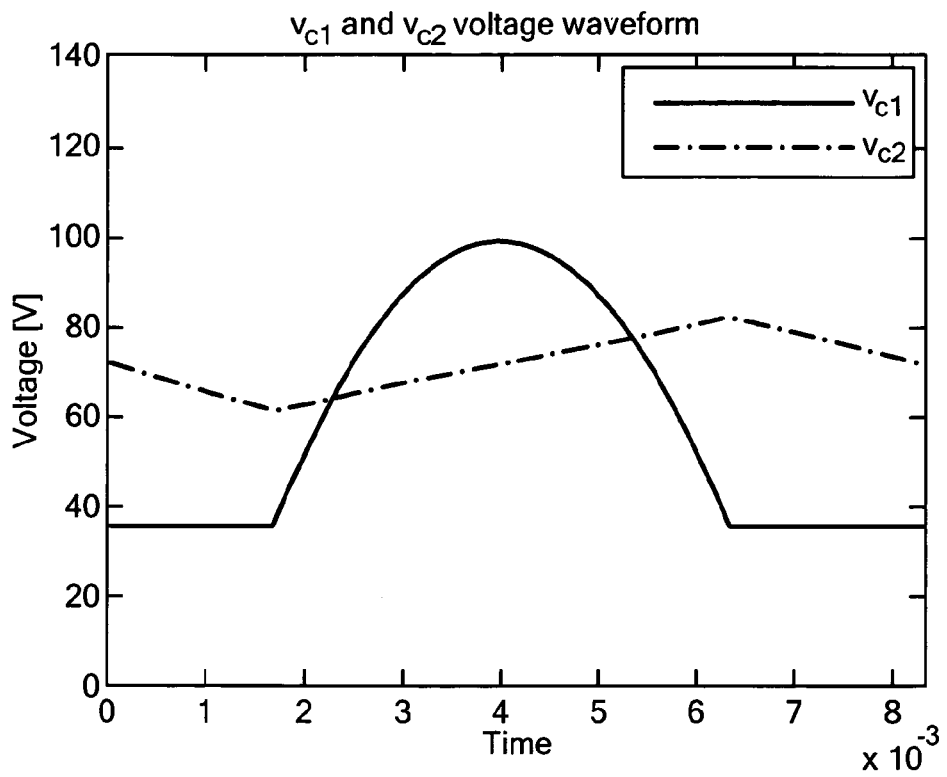
Figure 21:
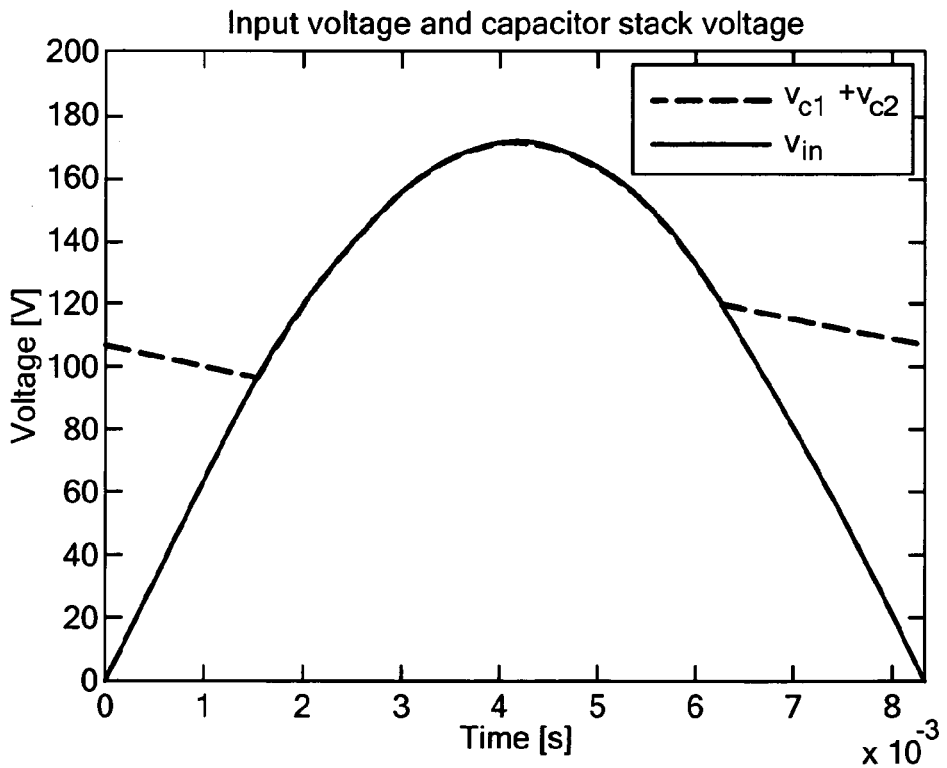
Figure 22:
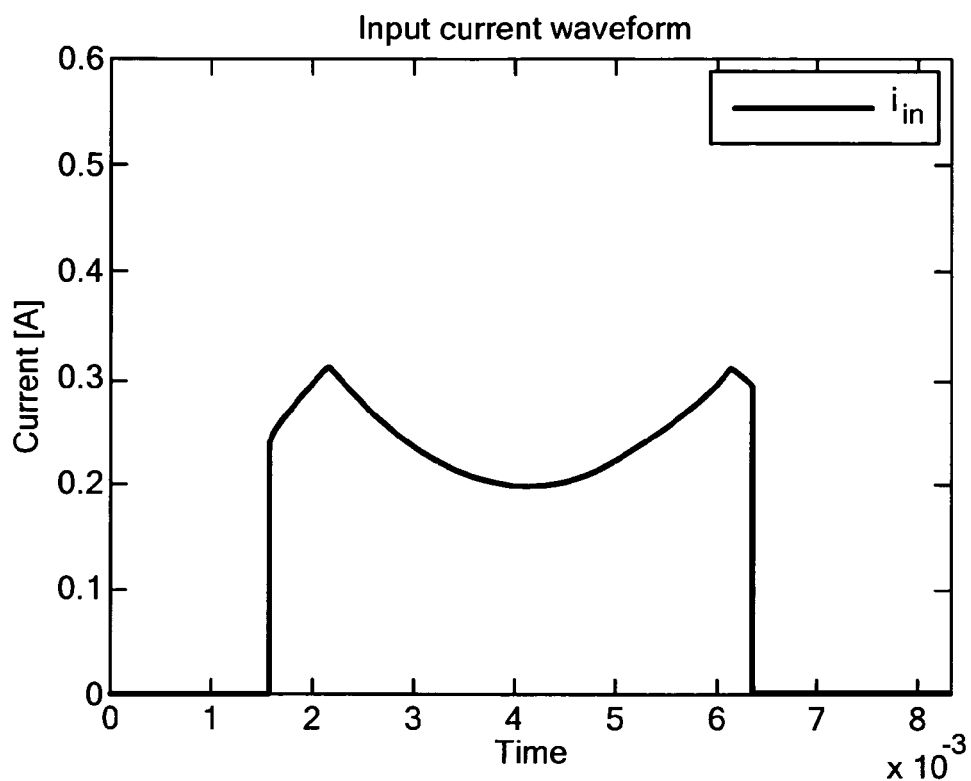
Figure 23:
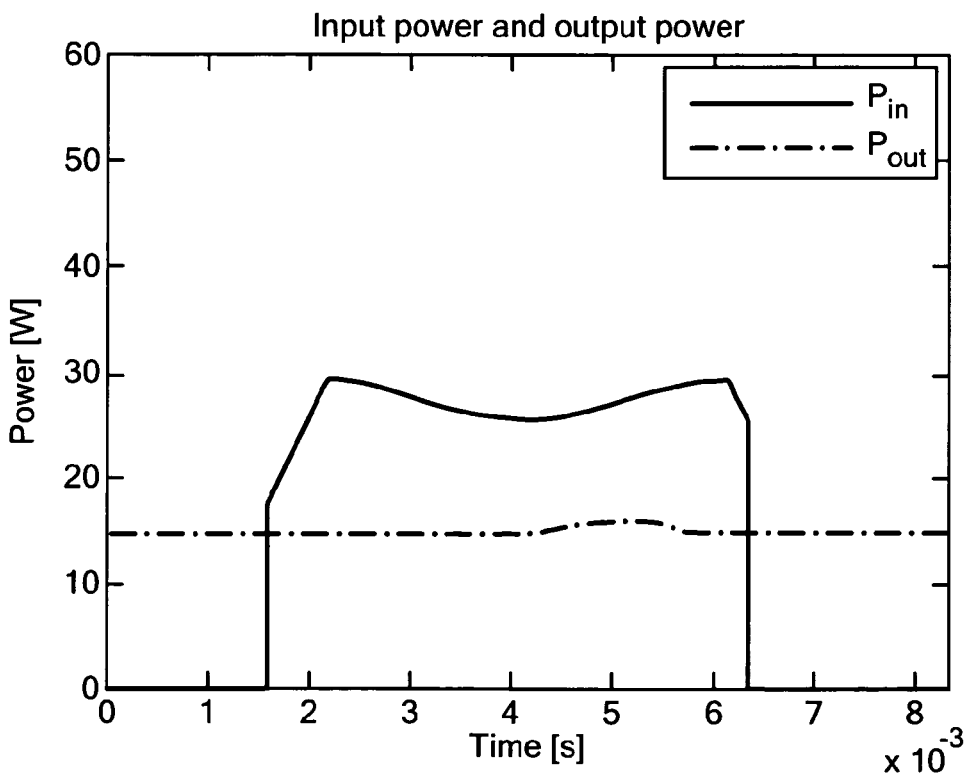
FIG. 23 is a diagram illustrating the input power and the output power associated with the power converter circuit operating in accordance with Example 4.
Figure 24:
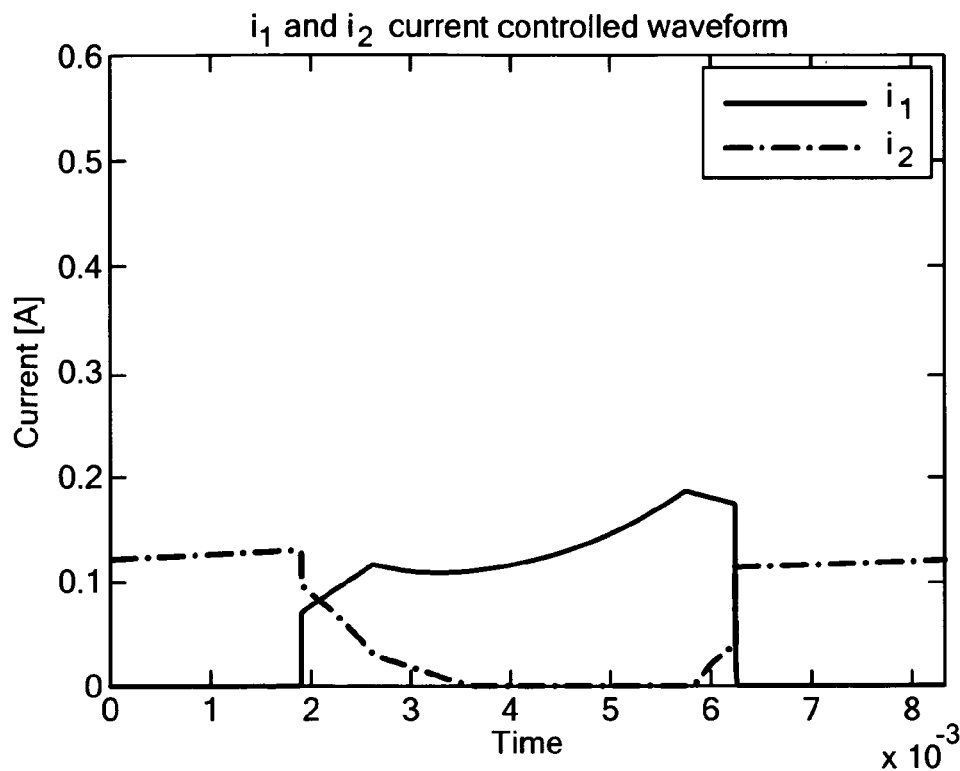
FIGS. 24, 25, 26, and 27 are waveform diagrams illustrating various current and voltage waveforms associated with a power converter circuit operating with input current modulated as a folded clipped sinusoid and with $C_1=1$ μF, $C_2=50$ μF, $P_{out}=10$ W, $V_{c1,i}=35$ volts, and $V_{c2,i}=81$ volts (Example 5)
Figure 25:
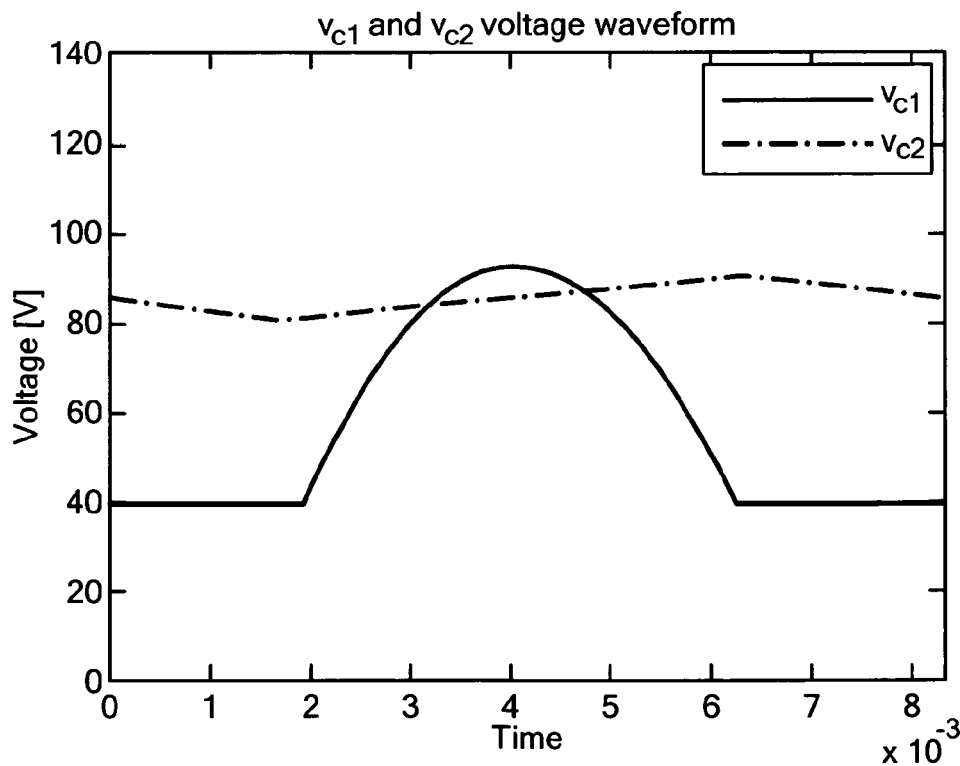
Figure 26:
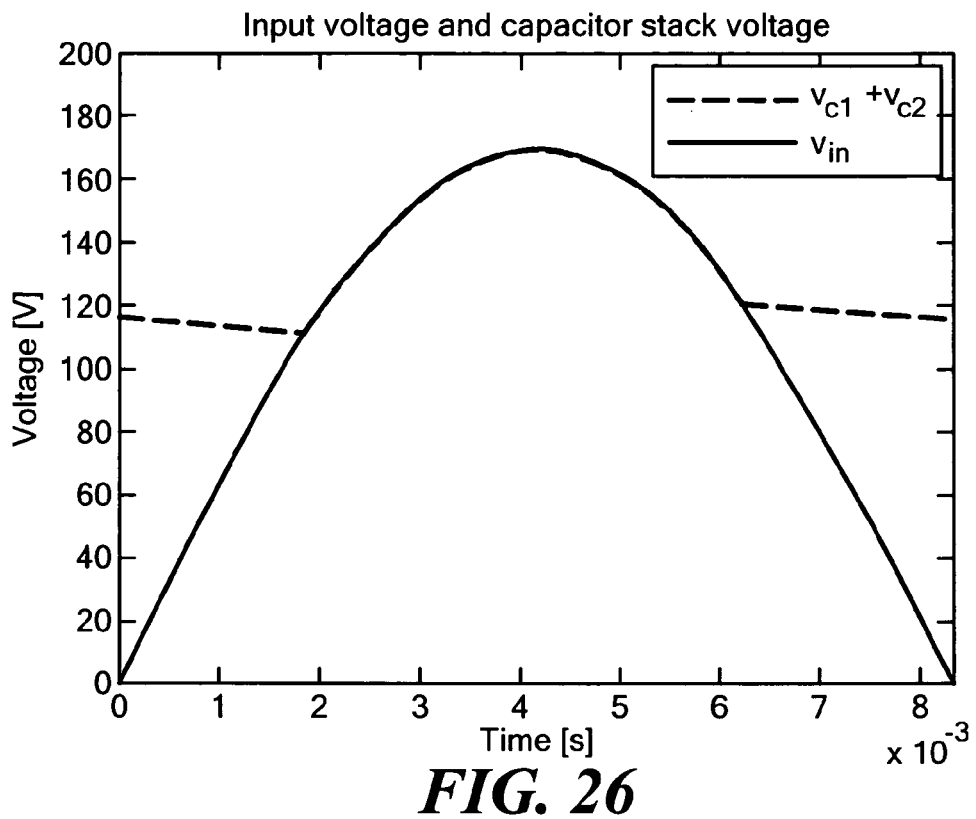
Figure 27:
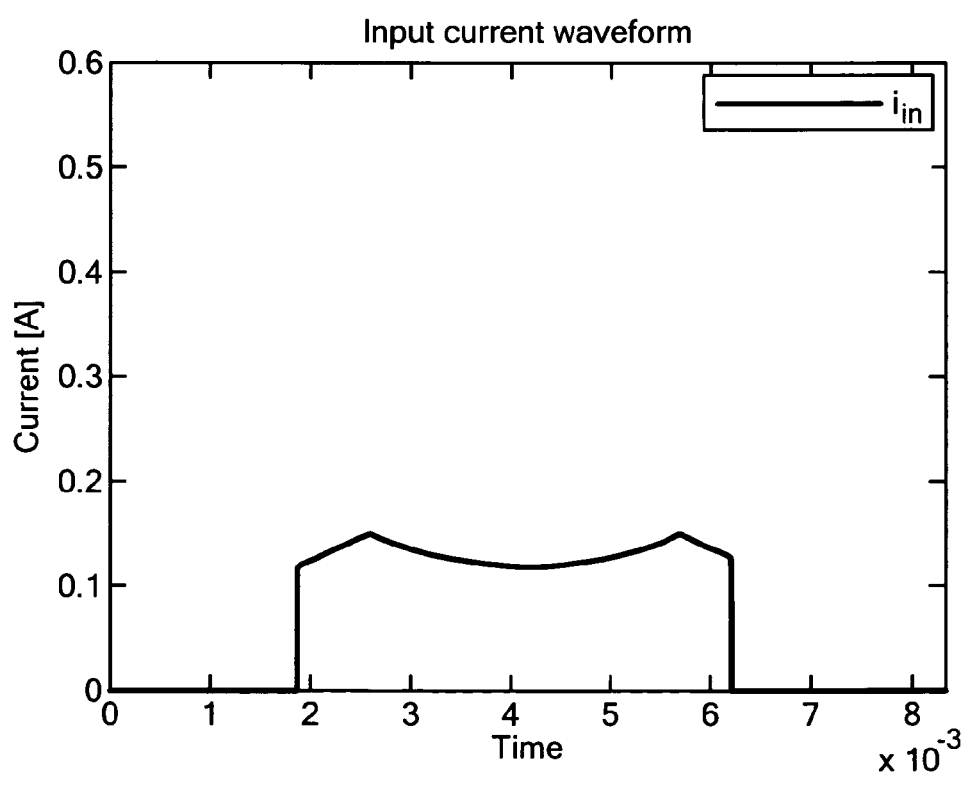
Figure 28:
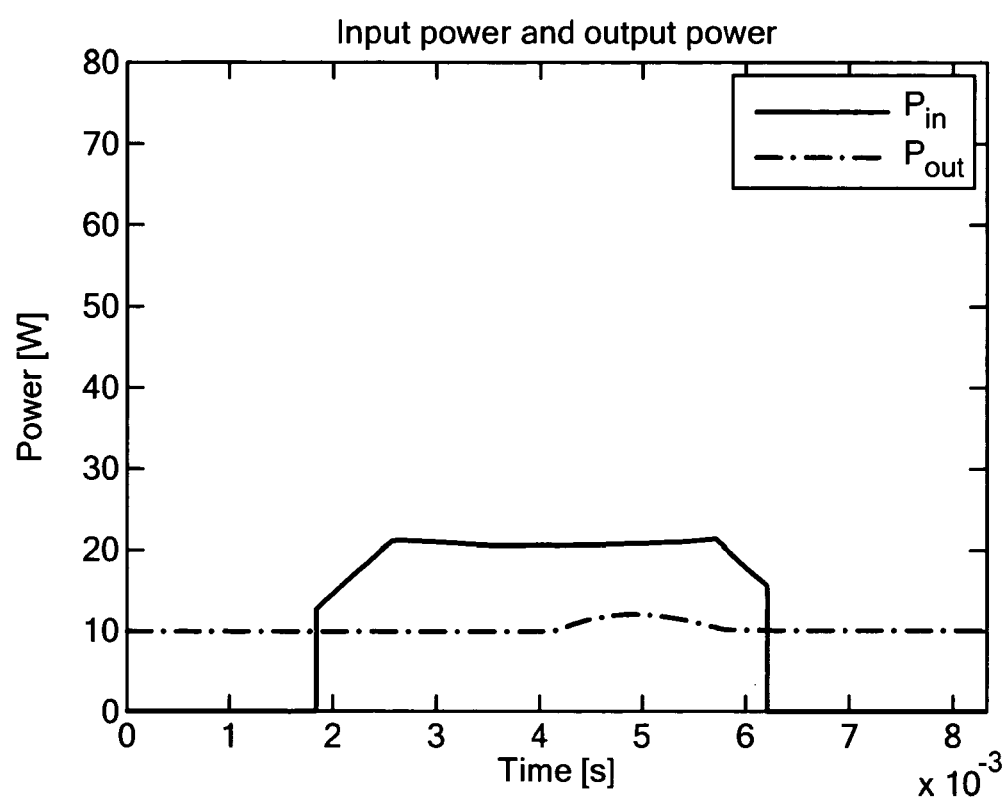
FIG. 28 is a diagram illustrating the input power and the output power associated with the power converter circuit operating in accordance with Example 5.

It should be noted that compared to the ac ripple on the buffered output power in FIG. 13 (which is based upon an approximate clipped sinusoidal input current waveform), the folded-clipped sinusoidal input current waveform yields better ac power buffering capability as shown in FIG. 18. Due to this folded clipped sinusoidal current waveform, the power factor is reduced to 0.9, which is nonetheless sufficient for many applications.

To compare and clarify the three examples discussed above, if the modulation currents $i_1$ and $i_2$ are always positive for a certain desired input current waveform, complete ac buffering is possible in the capacitor stack. On the other hand, with an approximate clipped sinusoidal input current waveform, if current $i_1$ or $i_2$ is assigned to be zero (instead of a negative current level), the capacitor stack does not totally buffer the ac input energy as described in the case 2 example. In this case, the folded clipped sinusoidal input current waveform helps the capacitor stack buffer the ac input energy, as shown in FIG. 18. However, there is a trade-off between the power factor and the ac energy buffer capability. Among various options of input current waveform, one can balance goals of high power factor, high power density, and requirements placed upon the regulating converter topology.

Example 4

$C_1=1$ µF, $C_2=50$ µF, Pout=20 W, $35 \leq v_{c1}(t)$, $v_{c2}(t) \leq 100$, and $i_{in}$=Folded-Clipped-Sinusoid In this example, additional simulation results were obtained for operating at a different power level with the same capacitor stack values. The initial state voltage was assumed to be $V_{c1,i}=35$ volts and $V_{c2,i}=71$ volts and the step-wise simulations are presented in FIGS. 19, 20, 21, 22, and 23. In this example scenario, a power factor of 0.9 is achieved.

Example 5

$C_1=1$ µF, $C_2=50$ µF, Pout=10 W, $35 \leq v_{c1}(t)$, $v_{c2}(t) \leq 100$, and $i_{in}$=Folded-Clipped-Sinusoid In this example, additional simulation results were obtained for operating at an even lower power level of 10 W with the same capacitor stack values. The initial voltages across the capacitors were set to $V_{c1,i}=35$ volts and $V_{c2,i}=81$ volts. FIGS. 24, 25, 26, 27, and 28 illustrate the resulting current, voltage, and power waveforms over the half line cycle. As before, simulation shows that a power factor of 0.9 can be achieved with sufficient input ac energy buffering operation.

It should be noted that in addition to the examples described above, numerous other techniques for modulating the current between each regulating converter with various input current waveforms may be used in different implementations. The results provided herein show that power factors up to 0.9 (and above) are achievable using the disclosed techniques, circuits, and concepts with complete energy buffering and constrained converter operation. In many applications (e.g., LED lighting for residential applications), power factors of 0.7 and above are considered sufficient, in other applications power factors of 0.8 are sufficiently high, and in still other applications (e.g., LED lighting for commercial applications) power factors of 0.9 are considered adequate. Consequently, the techniques presented herein provide means to achieve sufficient power factor in many applications.

The power converter architectures of the present disclosure have several possible advantages. One potential benefit is the decreased voltage stress to the components in the regulating converter and the power combining converter. In comparison to the common grid interface converter which directly confronts the grid voltage, each regulating converter of the proposed architecture operates at a fraction of the grid voltage because of the stacked capacitor structure (with an increased number of "stack" capacitors, this voltage stress may be further reduced.) The power combining converter, tied to the regulated outputs of the regulating converters, operates with low voltage stress range as well in some implementations.

Furthermore, power converter architectures disclosed herein are capable of providing better overall converter efficiency in many cases over prior structures. For example, in a traditional PFC circuit, such as a boost or flyback PFC circuit, the DC-DC converter stage after the PFC can dissipate a lot of power due to the high conversion ratio from the buffer capacitor voltage after the PFC circuit (e.g., around 300-400V) to the system output voltage. In the proposed architecture, on the other hand, each regulating converter can operate under much higher efficiency because of the reduced conversion ratio from each capacitor stack voltage to the regulated output voltage (e.g., about one quarter the conversion ratio in some implementations). In addition, the power combining converter of the present architecture, which may also operate from the low regulated voltage, may also provide high efficiency.

The grid interface power converter approach described herein is, in many cases, suitable for substantial miniaturization through a combination of architecture, circuit topology, and greatly increased switching frequencies. To enhance miniaturization, increases in switching frequency may be necessary because the values of inductors and capacitors vary inversely with switching frequency. However, the sizes of passive components do not necessarily decrease monotonically with frequency, owing to magnetic-core loss, voltage breakdown, and heat transfer limits. Consequently, achieving substantial miniaturization through high frequency operation further relies upon appropriate passives design and careful selection of circuit topology to minimize the demands placed upon the passive components, especially the magnetic components. It should also be noted that the capacitor stack structure can help the top regulating converter operate at high frequency, providing ac ground at the regulating converter switching frequency (i.e., the voltage across each capacitor stack changes so slowly across the line cycle that even the top regulating converter can be easily operated at high frequency).

In addition to miniaturized passive component size from high frequency operation, the behavior of grid interface architectures of the present disclosure suggests the use of smaller energy-buffer capacitors and smaller inductor component levels. Considering that the total energy stored in a capacitor $$\frac{1}{2}CV^2$$

and that the ac energy sloshes back and forth into and out of the buffer capacitor across the line cycle, a large capacitor is required to buffer this ac sloshing energy with low voltage variation across the capacitor $$\left(\text{i.e., } \frac{1}{2}C(V+\Delta V)^2 - \frac{1}{2}CV^2 = \text{ac sloshing energy}\right)$$

In the proposed grid interface architecture, the stacked capacitors right after the full bridge rectifier buffer the sc energy, and can be controlled to large voltage variations by active current modulation of the two regulating converter legs. This large voltage variation, as already shown in the simulation results, allows smaller capacitors to be used (e.g., about 30-200 µF for designs operating at tens of Watts from 120 Vac) to store the ac sloshing energy.

Additionally, a smaller inductor can be used with the reduced impedance level at the regulating stage as compared to a conventional converter. Converters operating at high voltages and low currents operate at high impedance levels, and consequently utilize relatively large inductors and small capacitors (e.g., characteristic impedance $$Z_0 = \sqrt{L/C}$$

scales as V/I). Furthermore, inductor and capacitor values scale down with increasing resonant frequency $$(\text{e.g., } f = 1/\sqrt{LC}).$$

Thus, for a given topology, increasing frequency beyond a certain point may lead to capacitance values that are too small to be practically achievable (i.e., given parasitics), placing a practical bound on frequency and miniaturization. For miniaturization of converters at relatively high voltage and low power, it is preferable to select system architectures and circuit topologies that require relatively low characteristic impedance values (i.e., small inductances and large capacitances) to reduce constraints on scaling up in frequency. The proposed architecture roughly divides the input voltage range of each regulating converter by two (or more), and thus decreases the inductance level by four with a given capacitance. Consequently, the entire converter with two regulating converters can be designed with smaller inductor values and size. As will be described in greater detail, in some embodiments, more than two capacitors may be used in the capacitor stack, further reducing required individual inductance values and enabling higher frequencies to be employed.

In at least one implementation, bi-directional grid interface power converters are provided that can convert from ac to dc and also from dc to ac. Such bi-directional converters require proper device and topology selection and control. In at least one embodiment, for example, a line frequency bridge may be provided that also serves as an inverter for dc to ac conversion (e.g., by replacing diodes with active devices). Control circuitry is also provided to control operation of the inverter. Power converter circuits that only serve as do-to-ac converters may also be produced.

As described previously, the grid interface power converter architecture 10 of FIG. 1 comprises a line-frequency bridge rectifier 12 with a stack of two capacitors 14 across its output; a pair of regulating converters 16; and a power combining converter 18 having two inputs and an output that supplies the system output. It should be understood that certain modifications and variations may be made to this architecture without departing from the spirit and scope of the disclosure. For example, modifications may be made to the number of each different component in the architecture, to the configuration for interconnecting the different components, and to the types of circuit elements used to implement each component. Likewise, one or more elements may be added to and/or removed from the architecture in different implementations.

Figure 29:
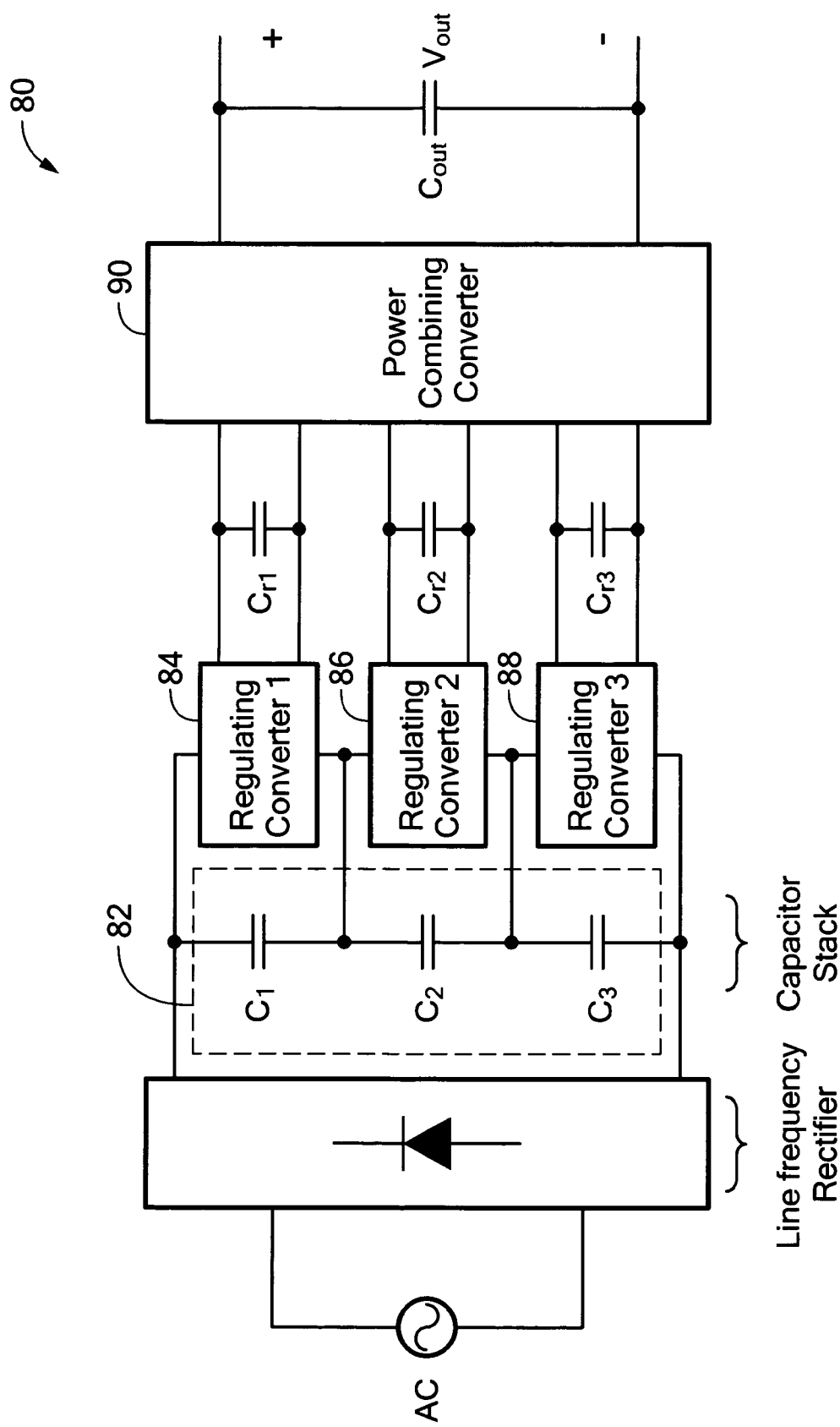
FIG. 29 is a schematic diagram illustrating an example grid interface power converter architecture that includes more than two capacitors in the capacitor stack in accordance with an embodiment.

FIG. 29 is a schematic diagram illustrating a grid interface power converter architecture 80 that includes a capacitor stack 82 having three capacitors. Correspondingly, the power converter architecture 80 also includes three regulating converters 84, 86, 88 which are each coupled at an output thereof to a power combining converter 90. In some implementations, the number of capacitors and sub-regulating-converters that are active may be allowed to vary dynamically or adapt over time based on a predetermined criterion (e.g., based on whether the line voltage is currently 120 or 240 $V_{rms}$ or based upon the ac rms voltage amplitude within a range This approach provides greater flexibility of operation and narrower component operating ranges than could otherwise be achieved. The variation may be provided, for example, by providing circuit structures that allow one or more of the stack capacitors to be controllably shorted out. Other techniques may alternatively be used. It should be appreciated that this architecture may be further extended to use even more capacitors in the capacitor stack. Such an extension might be desirable in designs for "universal input" (e.g., operable from 85-265 $V_{ac,rms}$).

Figure 30:
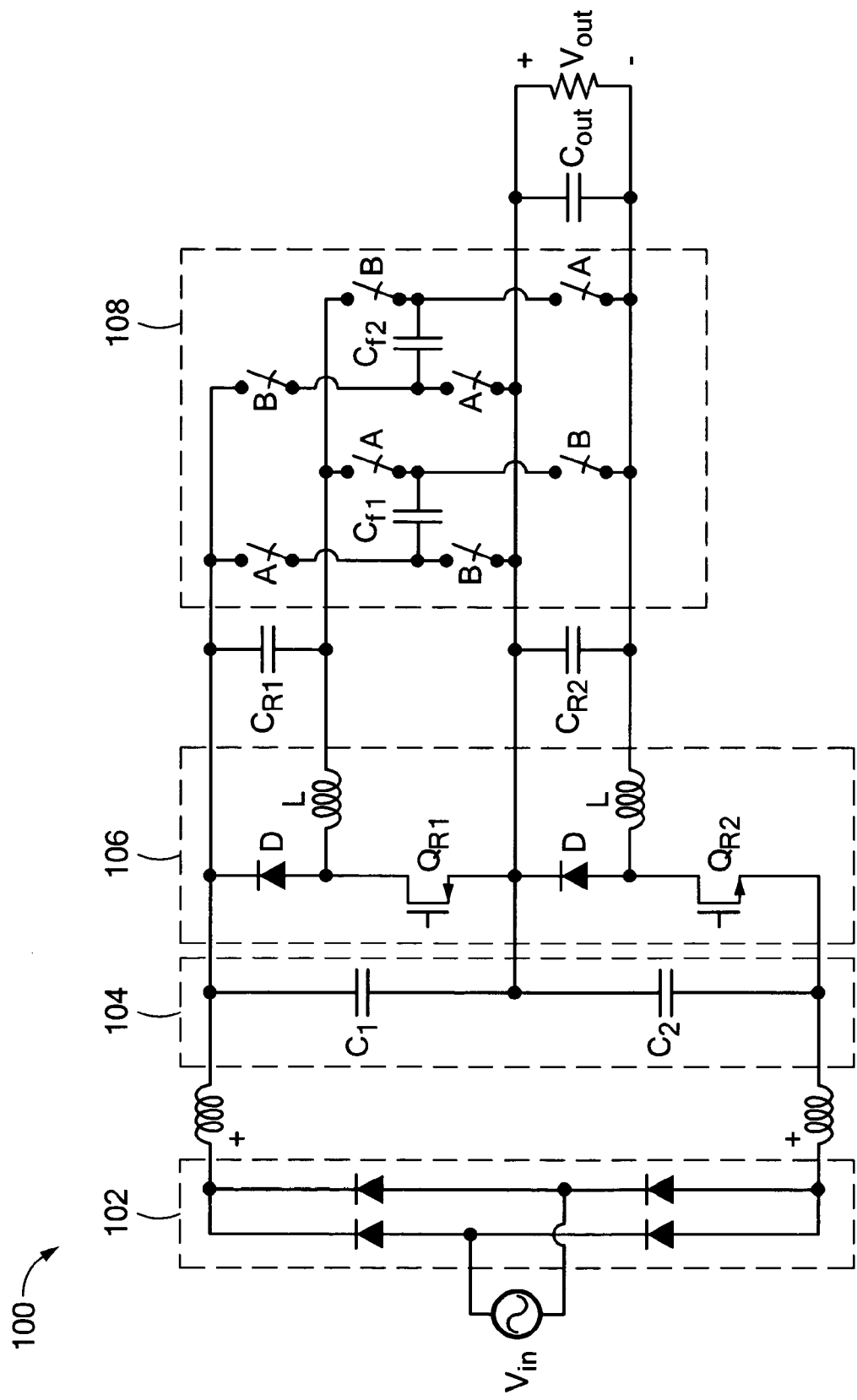
FIG. 30 is a schematic diagram illustrating an example grid interface power converter circuit that uses inverted resonant-transition buck converters as regulating converters and an interleaved switched capacitor circuit as a power combining converter in accordance with an embodiment.

FIG. 30 is a schematic diagram illustrating a prototype grid interface power converter circuit 100 in accordance with an embodiment. The prototype grid interface power converter circuit 100 was built and tested and found to operate at a high performance level. As illustrated, the grid interface power converter circuit 100 includes: a line-frequency rectifier 102, a capacitor stack 104, a set of regulating converters 106, and a power-combining converter 108. To achieve high efficiency and high power density, the regulating converters 106 were designed as inverted resonant-transition buck converters and the power combining converter 108 was designed as an interleaved switched capacitor circuit. The regulating converters 106 were each designed with a single switch, diode, and small inductor and operate in the HF frequency range (i.e., 3-30 MHz). The buck converters are "inverted" in the sense that they were designed with "common positives." An advantage of this is that the active switch control ports are each referenced to slowly-moving node voltages, simplifying the task of driving them at high frequencies.

For much of their operating range, the regulating converters 106 act like quasi-square-wave zero-voltage switching (ZVS) buck converters with a low ratio of switching to resonant frequency. Outside of this range, the converters do not operate with perfect zero-voltage switching, but rather provide near ZVS operation with low turn-on loss of the active switch. Each regulating converter takes as an input one of the capacitor voltages from the capacitor stack and provides a regulated voltage across its output capacitor. This regulating converter design has several benefits. First, it operates with ZVS or near-ZVS soft switching across the 35-100 V wide input voltage range. The single common referenced switch (referenced to a slowly-moving potential) makes it suitable for operation at HF. Second, it requires only a single, small-valued inductor. Furthermore, it has very fast response (near single cycle) to input voltage transients and changes in the output current command. Finally, for a given input voltage, the output current is roughly proportional to transistor on-time, allowing a variety of control schemes to be employed.

The power combining converter 108 in the embodiment of FIG. 30 is implemented as an "interleaved" switched capacitor circuit. The interleaved switched-capacitor circuit is an effective choice for high efficiency and power density, as the converter doesn't need to provide regulation. The switched capacitor circuit draws energy from the two regulating converter outputs and supplies a single system output (which is also the output of one of the regulating converters 106). Because the switched capacitor circuit transfers charge without voltage regulation, and is designed with switches and capacitors, it can be operated with high efficiency at low frequency, with small converter size. In the switched capacitor power combining converter 108 of FIG. 30, the capacitors $C_{f1}$ and $C_{f2}$ transfer charge from capacitor $C_{R1}$ to capacitor $C_{R2}$ and supply the combined power to the load. Because the load is connected across the output of one of the regulating converters, the switched capacitor power combining converter 108 only processes a portion of overall system energy. Moreover, if $C_{f1}$ and $C_{f2}$ are selected as much larger than $C_{R1}$ and $C_{R2}$, partial "soft charging" of the energy transfer capacitors can be achieved.

To test the prototype power converter circuit 100, an example system was implemented based on the topology describe above. The system was designed to supply 30 W to a 35V DC output from a 120 $V_{rms}$ AC 60 Hz input. The converter circuit 100 can buffer the AC energy with C1=1 µF and C2=50 µF at the 30 W power level. To select practical capacitor values, it was recognized that the capacitance of high-k ceramic capacitors degrades with bias voltage. Consequently, a 1 µF, 100V, X7R capacitance was used for C1 and a (nominal) 225 µF, 100 V X7S ceramic capacitor was used for C2. For the regulating converters, the prototype circuit used a gallium nitride (GaN) switch (EPC 2012) for $Q_{R1}$ and $Q_{R2}$; a Schottky diode (STPS30120DJF) for diode D; and an 800 nH inductance using 10 turns on a Micrometals P68-106 core for L. For the power combining convertor 108, the prototype circuit used a GaN switch (EPC 2012) for the switches, and a 20 µF, 100V, X7R ceramic capacitor for $C_{f1}$ and $C_{f2}$. For control, the prototype used an Atmel ATtiny 1634 microcontroller. With the above values, the regulating converters were able to operate in the range of 5-10 MHz under soft-switching or near-soft-switching conditions over their input voltage and power range. The power combining convertor 108 operates at a fixed switching frequency of 30 kHz (although a variable frequency, e.g., proportional to operating power, could be employed).

Among other possible control functions, the microcontroller was used to control the average current of each regulating converter and to synchronize operation over the line cycle. The microcontroller was also used to, for example, detect the zero-voltage crossing of the ac line voltage and reset the time state. The microcontroller may also monitor the capacitor stack voltage (e.g., the input voltage of each regulating converter) and send updated pro-defined switch-turn-on duration information to each regulating converter at periodic intervals (e.g., every 80 µS or so) in response thereto. In addition, the microcontroller may generate a 30 kHz 50% duty ratio switching signal (with dead time) for the combining converter. As will be appreciated, the functions of the microcontroller may vary from implementation to implementation based on the specific types of circuits that are used as the regulating converters and the power-combining converter.

Figure 32:
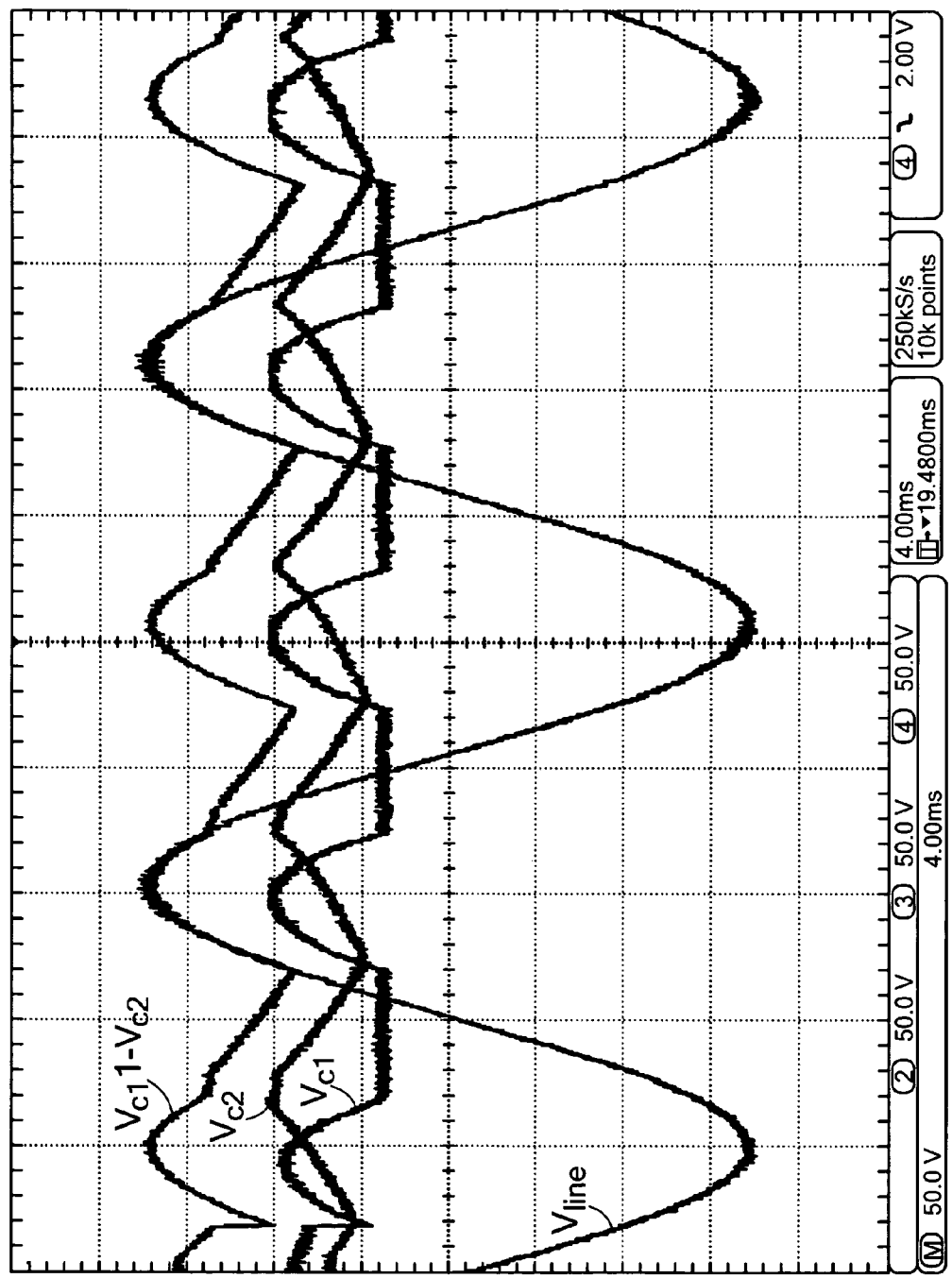
FIG. 32 is a waveform diagram illustrating measured voltage waveforms for a prototype converter at startup and during operation over an ac line cycle.
Figure 33:
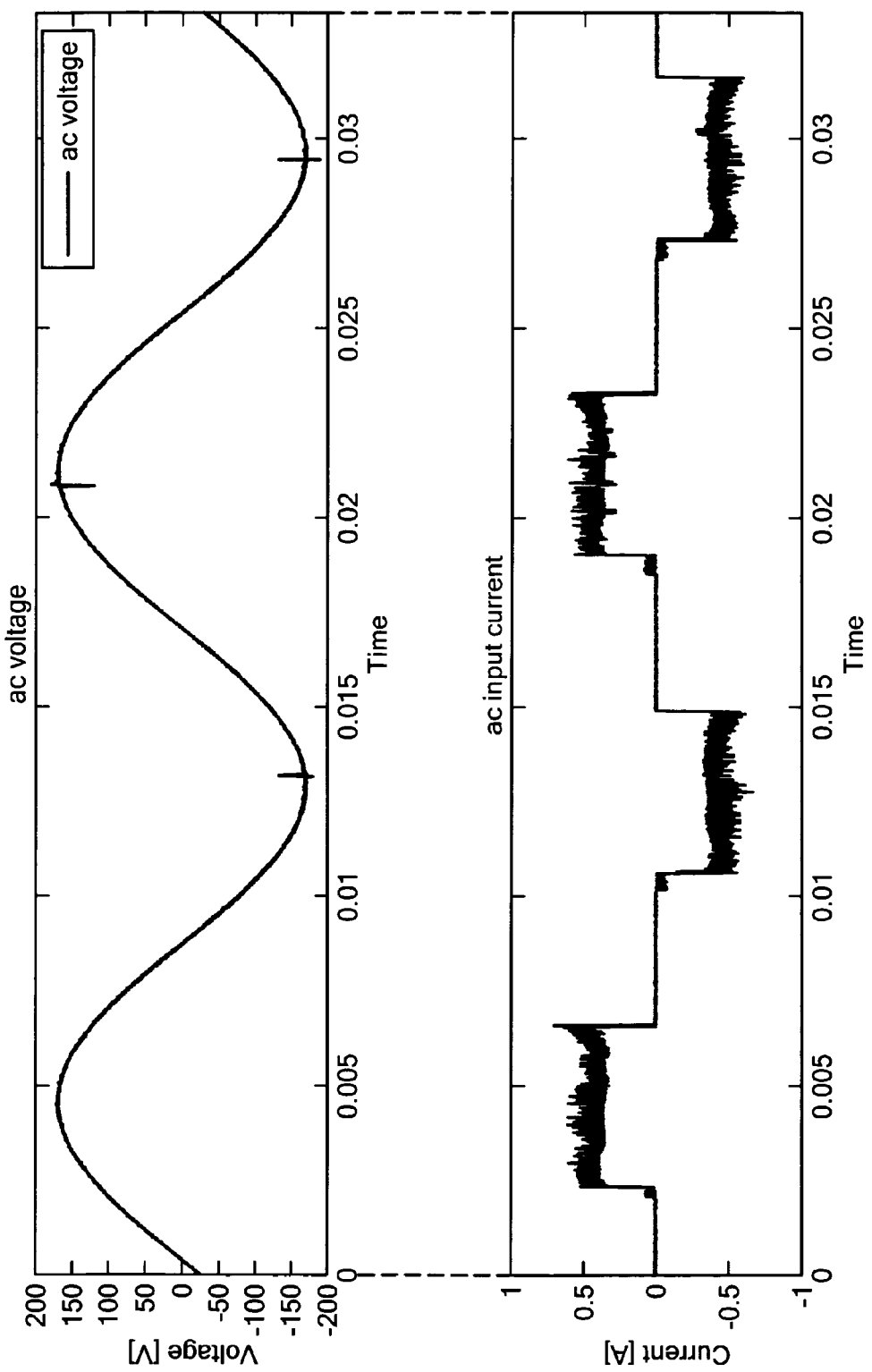
FIG. 33 are waveform diagrams illustrating measured ac input voltage and measured AC input current for the prototype converter.

The prototype converter was designed to support up to 30 W output at 35V from 120 Vac. FIG. 32 shows measured voltage waveforms of the prototype converter at startup and during operation over the ac line cycle, when powered from an Agilent 6812B ac power supply. The waveform labeled $V_{C1}$ represents the voltage across capacitor $C_1$ and the waveform labeled $V_{C2}$ represents the voltage across capacitor $C_2$. As shown, $V_{C2}$ fluctuates about 50 V over the line cycle in this prototype converter as it buffers the line-frequency energy. FIG. 33 shows the measured input AC voltage and current for the prototype converter. The prototype converter displayed 93.3% efficiency with 0.89 power factor for a 35 Vdc, 30 W load.

The volume of the prototype converter was measured and the "box power density" was calculated to be 25 W/in$^3$. It is notable that this is much higher than the approximately 5 W/in$^3$ found for typical commercial LED drivers at this power rating, even though the component layout was not optimized for box volume power density. The displacement volume was 0.23 in$^3$ yielding a "displacement power density" of 130 W/in$^3$. This illustrates the high power density achieved, and that layout can readily provide a greatly improved "box power density."

Figure 31:
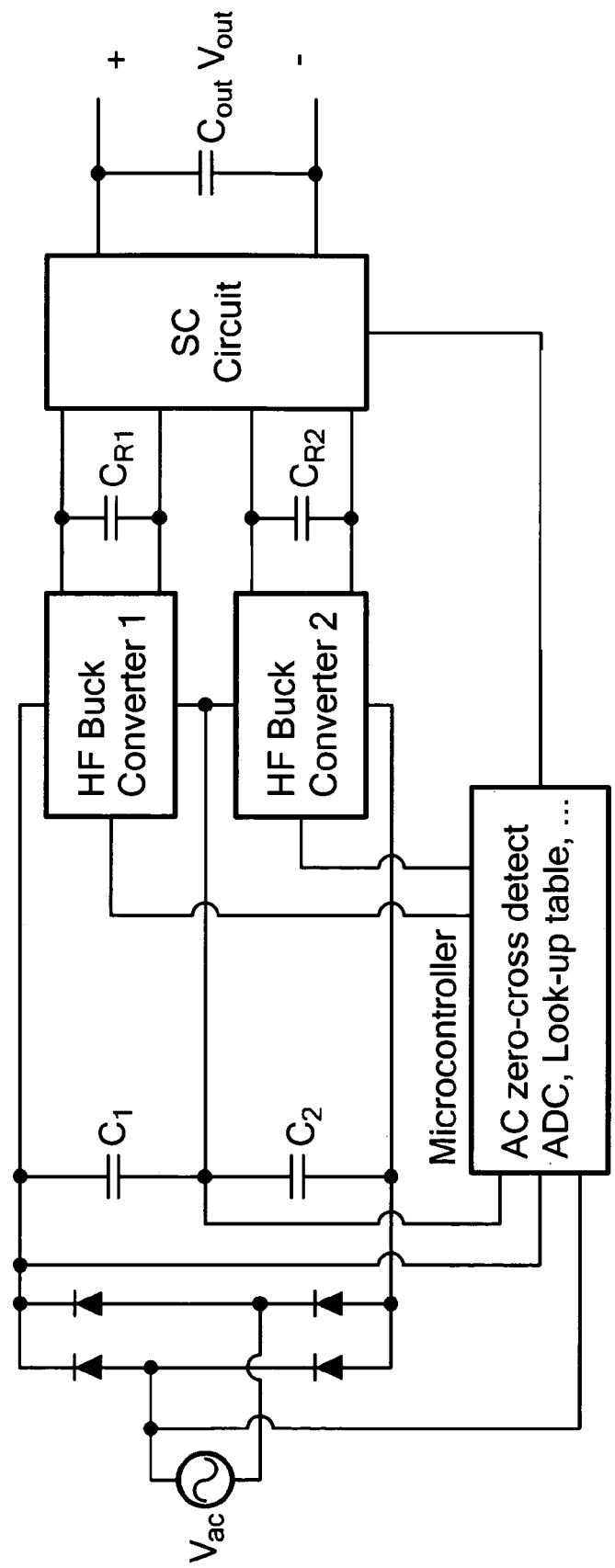
FIG. 31 is a schematic diagram illustrating a control arrangement that may be used with the grid interface power converter circuit of FIG. 30 and other converters.

FIG. 31 is a diagram illustrating how a microcontroller may be coupled to various elements of a power converter circuit in accordance with an embodiment. Although illustrated in FIG. 31 as a microcontroller, it should be appreciated that many other types of processors and/or circuits may be used to provide control functions in a power converter in different embodiments. For example, in various embodiments, the control functions may be performed by: a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, a processor complex, and/or others, including combinations of the above. One or more analog control circuits may also be used in addition to, or as an alternative to, digital processing structures. For example, the controls for the inverted resonant-transition buck converters may use comparators to detect voltage ringdown for soft switching, and may employ analog time-based control to realize the PWM. In various embodiments, techniques, systems, and circuits described herein may be implemented using any combination of hardware, software, and firmware.

There are various way to control the proposed circuit architecture. As a first option, the control circuitry can save the predefined current waveform for various power levels, and modulate regulating converters to draw predefined current waveform. As an alternative option, the separate feedback control circuits for each regulating converter can be utilized to regulate each output of regulating converter, and the proposed system is controlled by selecting which regulating converter to turn on. The input current waveform is decided by the power level and the instantaneous operating voltage of each regulating converter.

Figure 33A:
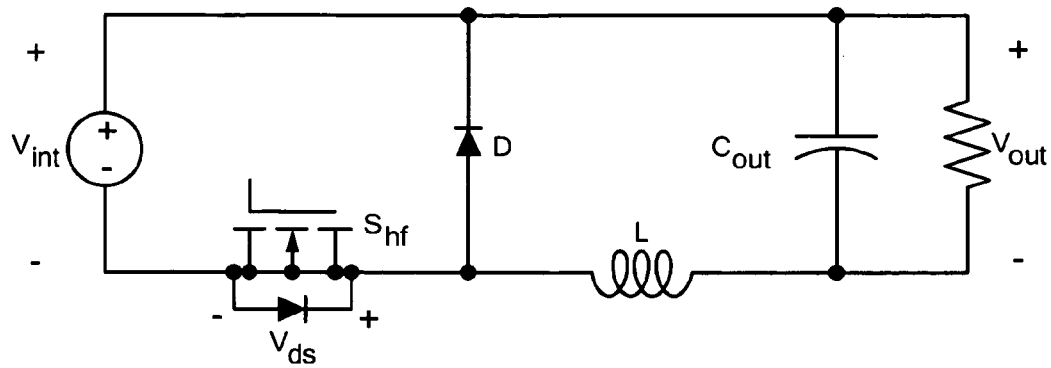
FIG. 33A is a schematic diagram illustrating an example inverted resonant buck converter that may be used with the grid interface power converter circuit of FIG. 30 and other converters.

There are also various ways to control the inverted resonant buck converter of the proposed circuit architecture, like example inverted resonant buck converter shown in FIG. 33A. Illustrated in FIGS. 33B and 33C, for example, are an example operation of the inverted resonant buck converter shown in FIG. 33A and associated control circuitry for achieving said operation, respectively.

Figure 33B:
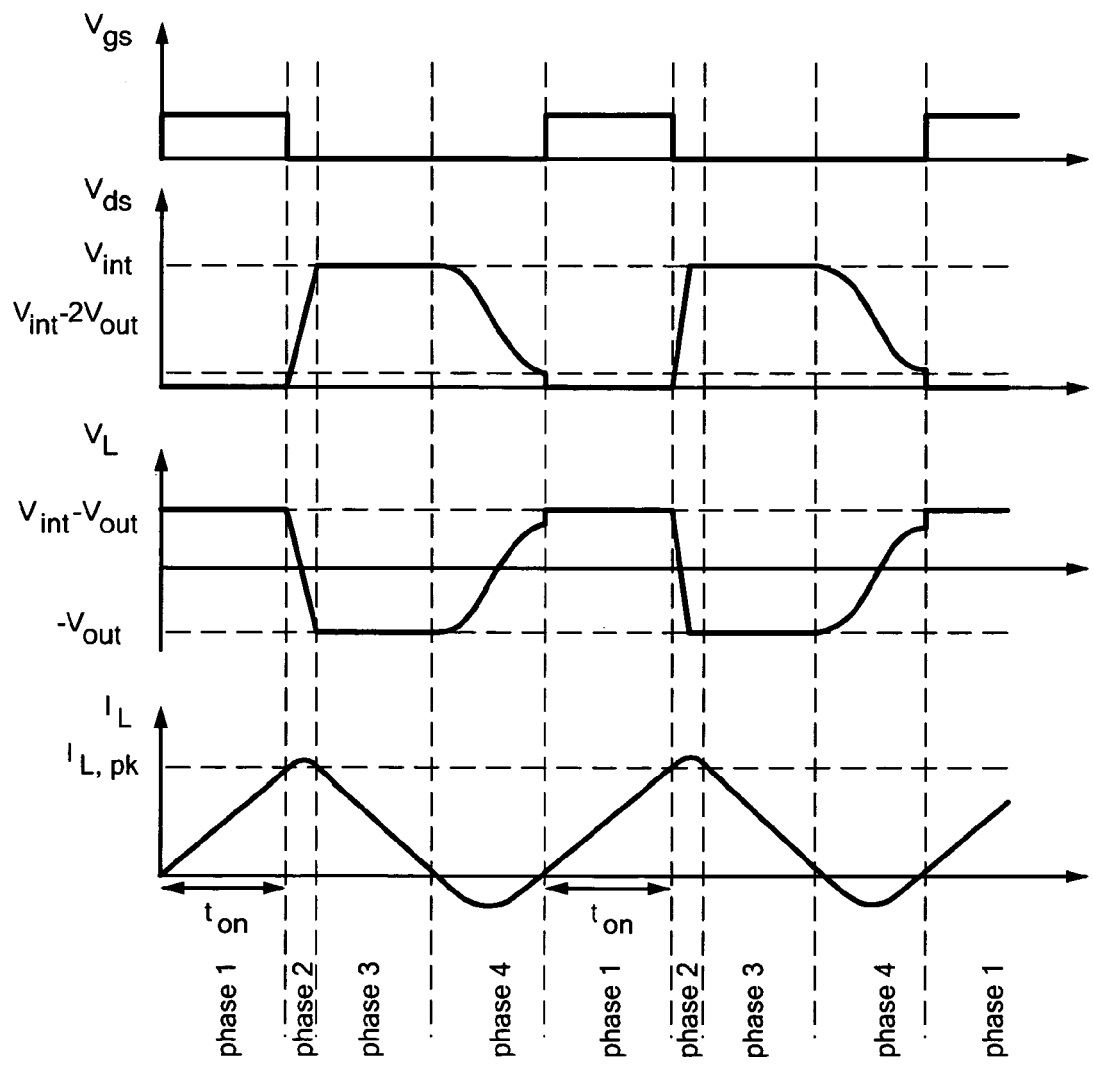
FIG. 33B is a plot illustrating an example operation of the inverted resonant buck converter of FIG. 33A.

In operation, as shown in FIG. 33B, the inverted resonant buck converter (e.g., of FIG. 33A) cycles through four phases of a HF frequency cycle (denoted by phase 1, phase 2, phase 3, and phase 4), like the HF frequency cycle shown in FIG. 7. In particular, in phase 1 of the HF frequency cycle, a switch (e.g., S$_{hf}$, shown in FIG. 33A) of the inverted resonant buck converter is toggled on and, as a result, inductor current (e.g., i$_L$) of inductor (e.g., L, shown in FIG. 33A) ramps up linearly. In phase 2, the switch (e.g., S$_{hf}$, shown in FIG. 33A) is toggled off and, as a result, switch drain to source voltage (e.g., v$_{ds}$, shown in FIG. 33A) of the inverted resonant buck converter increases to a same voltage level as the input voltage (e.g., V$_{int}$, shown in FIG. 33A), which is substantially the same as or similar to an HF regulation stage input voltage. In phase 3, a diode (e.g., D, shown in FIG. 33A) begins to conduct current and, as a result, current flowing through the inductor (e.g., L, shown in FIG. 33A) ramps down to zero. In phase 4, the switch (e.g., S$_{hf}$, shown in FIG. 33A) is toggled off and, as a result, the diode (e.g., D, shown in FIG. 33A) stops conducting current and the inductor (e.g., L, shown in FIG. 33A) rings with a net capacitance observed at a switch drain node (not shown) of the inverted resonant buck converter, wherein the net capacitance is representative of switch output capacitance combined with diode output capacitance. Additionally, in phase 4 current flowing through the inductor (e.g., L, shown in FIG. 33A) ramps to a negative current value and the switch drain to source voltage (e.g., vds, shown in FIG. 33A) ramps down to or near a potential at or around zero volts (e.g., down to V$_{int}$-2V$_{out}$). Subsequently, the switch (e.g., S$_{hf}$, shown in FIG. 33A) is toggled on and the cycle repeats again starting at phase 1.

Figure 33C:
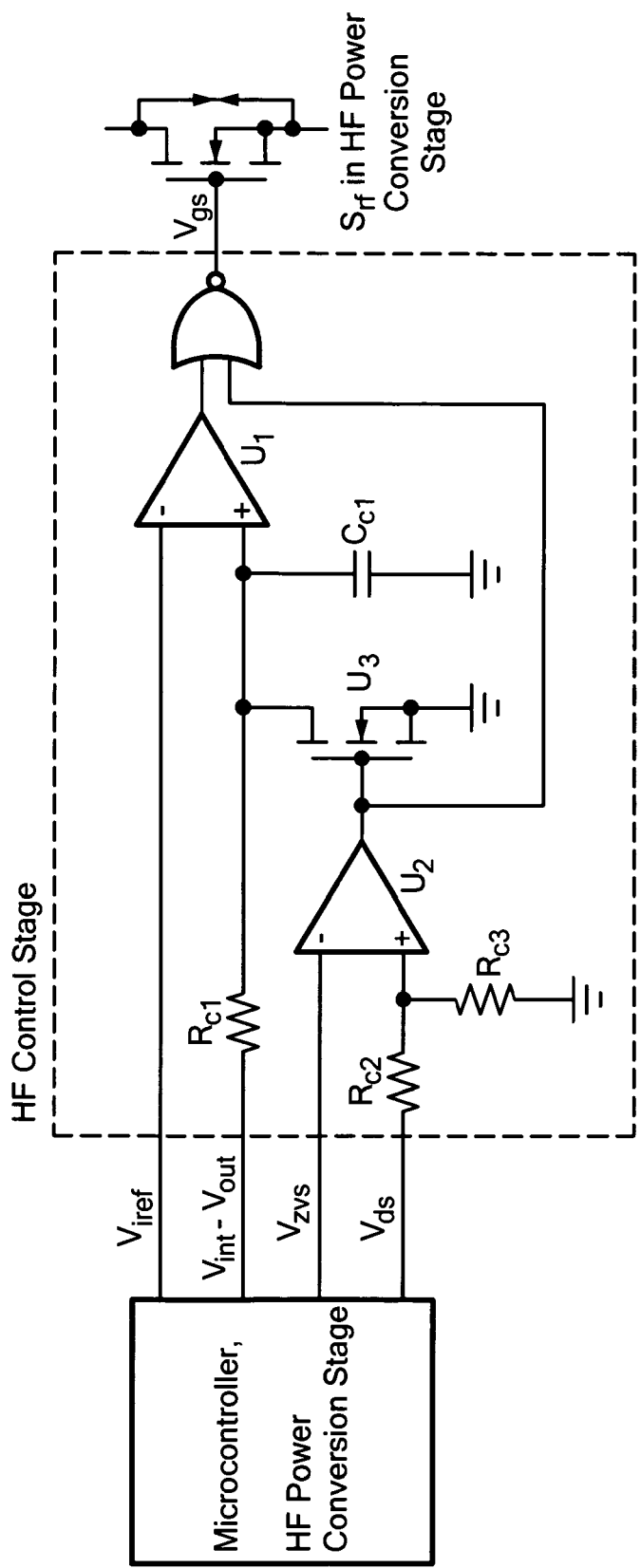
FIG. 33C is schematic diagram illustrating an example control circuit that may be used to control the inverted resonant buck converter of FIG. 33A and other converters.

FIG. 33C illustrates example control circuitry for achieving the example operation discussed above in conjunction with FIG. 33B, particularly in achieving a particular peak current in inductor L of the inverted buck converter shown in FIG. 33A and other similar converters. As shown, the example control circuitry comprises a microcontroller, a capacitor (C), a plurality of resistive loads (R), a logic gate, and two comparators, U$_1$ and U$_2$. It is to be appreciated that, in alternate embodiments, the control circuitry may, for example, comprise greater than or fewer than two comparators.

The control circuitry is configured to adjust output power (e.g., V$_{out}$, shown in FIG. 33A) of the inverted resonant buck converter by altering on-time (e.g., t$_{on}$, shown in FIG. 33B) of a switch (e.g., S$_{hf}$, shown in FIG. 33A) of the inverted resonant buck converter in any given phase (e.g., phase 4) of the HF frequency cycle. In particular, by specifying a peak amount of current (e.g., i$_L$) flowing through inductor (e.g., L, shown in FIG. 33A) on a cycle by cycle basis (e.g., complete cycle through phases 1 to 4 of the HF frequency cycle), average amount of current flowing through the inverted resonant buck converter can be set with a wide bandwidth range, especially when the control circuitry cycles at a frequency in the multi-megahertz range. Additionally, by specifying a peak amount of current flowing through the inductor (e.g., L, shown in FIG. 33A) on a cycle by cycle basis, short circuit protection of the inverted resonant buck converter can be achieved.

With knowledge of input voltage (e.g., V$_{int}$, shown in FIG. 33A) and peak current of the inductor (e.g., L, shown in FIG. 33A) of the inverted resonant buck converter, average input current can be set for any given load (R) with a constant output voltage (e.g., V$_{out}$, shown in FIG. 33A). Additionally and alternatively, with knowledge of input voltage (e.g., V$_{int}$, shown in FIG. 33A) and output voltage (e.g., V$_{out}$, shown in FIG. 33A), average input current and average output current can be determined. The aforementioned can be found particularly helpful in providing for power factor correction to the proposed circuit architecture discussed above. Specifically, the average input current can be set proportional to the input voltage (e.g., V$_{int}$, shown in FIG. 33A) and, in doing so, generate a unity of power factor for power factor correction. If power factor correction is not required, however, arbitrary input current waveforms can be suitably used for the average input current.

It is to be appreciated that the control circuitry of FIG. 33C can also be implemented in an open loop or forward feedback arrangement. As such, with there being no need to know input voltage (e.g., $V_{in}$, shown in FIG. 33A) or output voltage (e.g., $V_{out}$, shown in FIG. 33A) values of the inverted resonant buck converter, and hence no need to measure said input or output voltage values, cost, complexity, and power loss often associated with conventional control circuitry for inverted resonant buck converters (e.g., of FIG. 33A) and the like can be significantly reduced.

Figure 34:
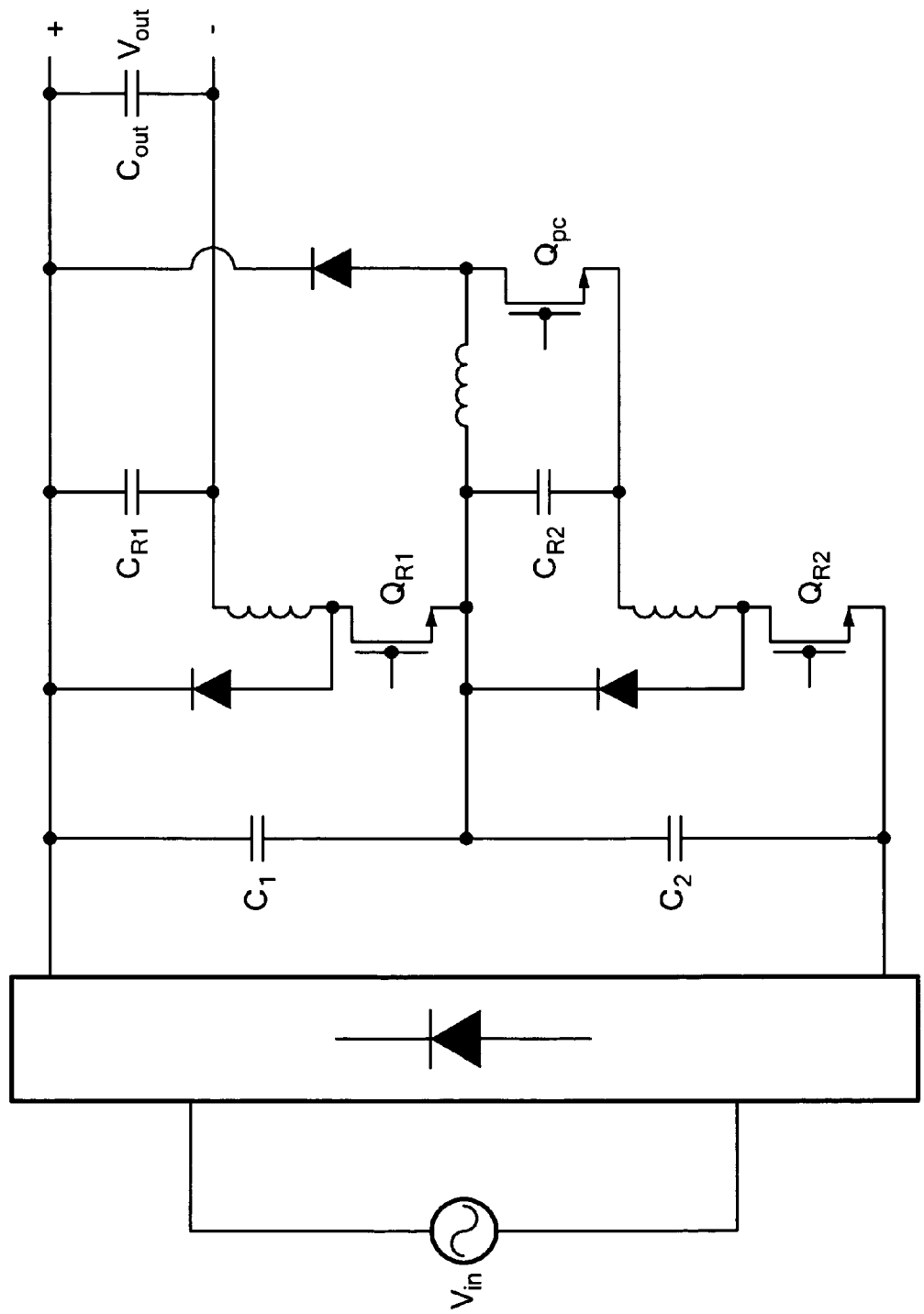
FIG. 34 is a schematic diagram illustrating an example grid interface power converter circuit that uses inverted resonant-transition buck converters as regulating converters and a buck-boost converter as a power combining converter in accordance with an embodiment.
Figure 35:
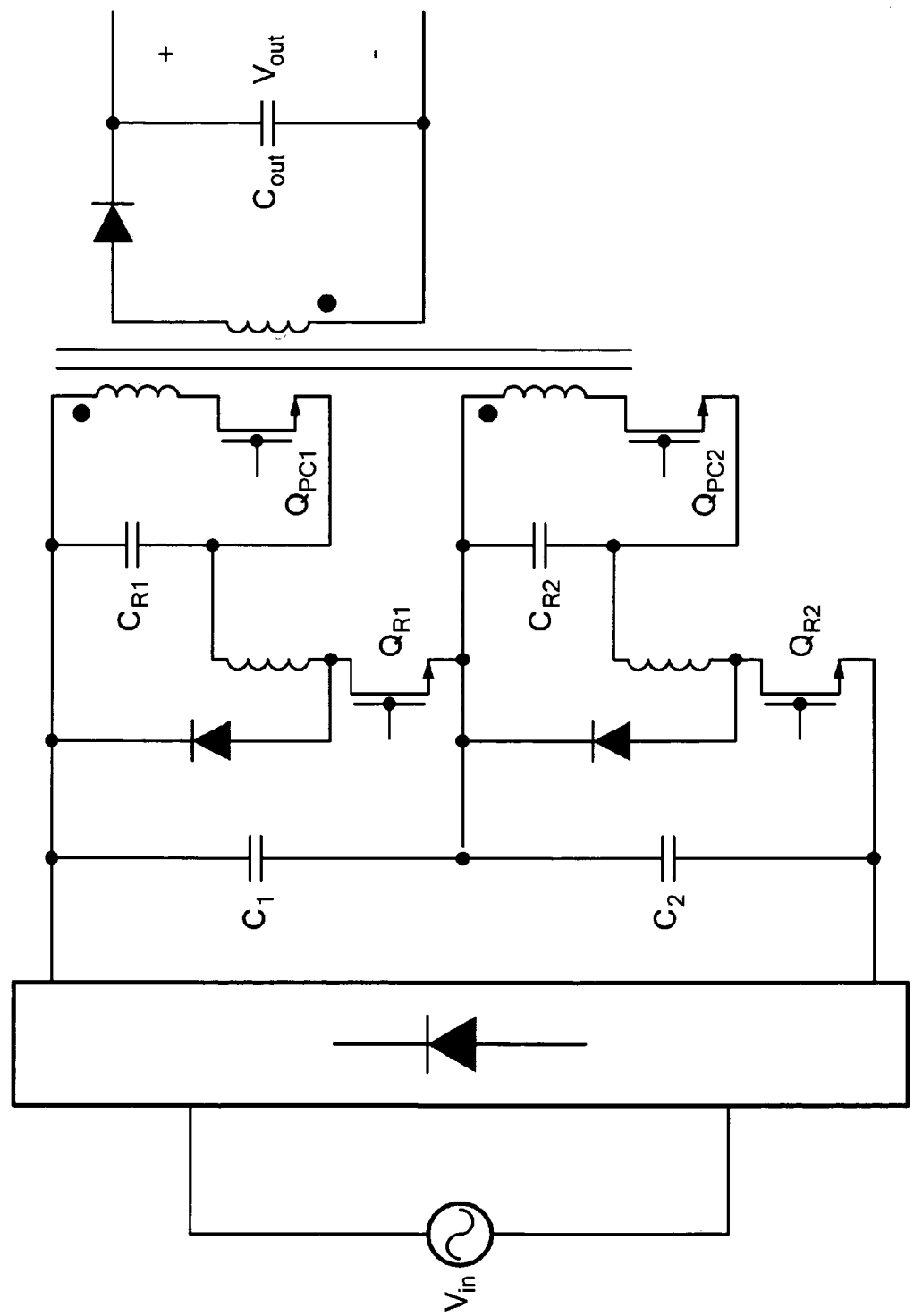
FIG. 35 is a schematic diagram illustrating an example grid interface power converter circuit that uses inverted resonant-transition buck converters as regulating converters and a multi-winding flyback converter as a power combining converter in accordance with an embodiment.

FIGS. 34 and 35 are schematic diagrams illustrating a number of grid interface power converter circuits in accordance with different embodiments. In each of these embodiments, a different combination of structures is used for the regulating converters and the power-combining converter. In the embodiment of FIG. 34, for example, the regulating converters are implemented as inverted resonant-transition buck converter and the power-combining converter is implemented as a buck-boost converter. In the embodiment of FIG. 35, the regulating converters are again implemented as inverted resonant-transition buck converters, but the power-combining converter is implemented as flyback converter. It will be recognized that other topologies may likewise be used. Various regulating converters can be employed, such as resonant transition buck converters, soft-switched synchronous buck converters, quasi-square-wave synchronous buck converters, tapped-inductor converters, indirect converters, etc.

Likewise the power combining converter could comprise a converter that takes energy from one (or more) regulating converter multi-input indirect converter outputs and provides it to a single regulating converter output. This could be done with a variety of isolated converter types, including flyback converters or resonant converters. The power combining converter may be realized as an isolated multi-winding converter (e.g., multi-input converter) with input-side switches of different inputs operated synchronously. This may be done with a flyback topology (as in FIG. 35), as a different multi-input PWM converter, as a multi-input resonant converter (e.g., multi-input LLC converter), etc.

Figure 36:
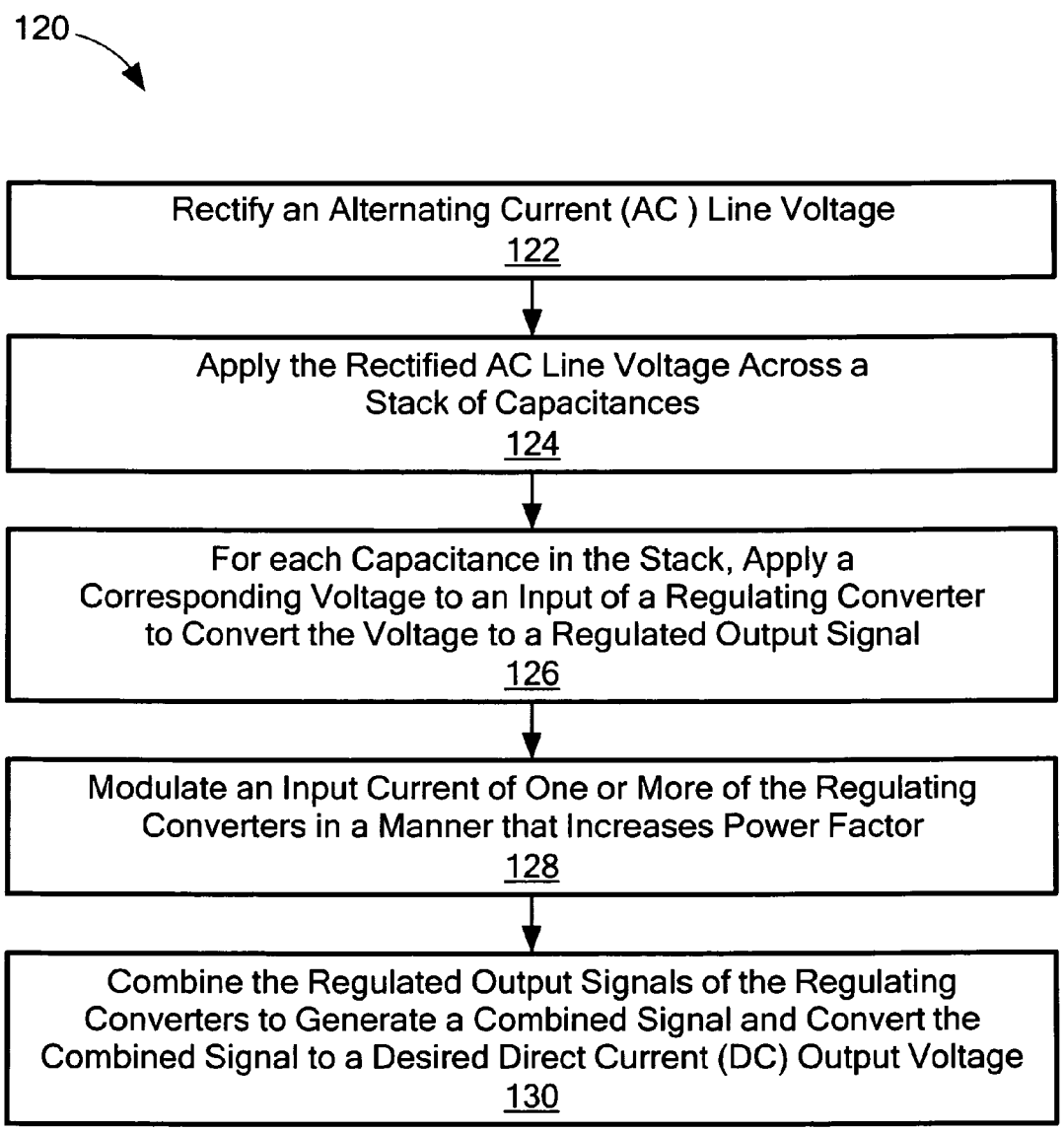
FIG. 36 is a flowchart illustrating a method of operating a power converter circuit in accordance with an embodiment.

FIG. 36 is a flowchart illustrating a method 120 of operating a power converter circuit in accordance with an embodiment. First, an ac line voltage is rectified (block 122). In some embodiments, full wave rectification is performed, but other rectification techniques may alternatively be used. The rectified ac line voltage is then applied to a stack of two or more capacitors (block 124). For each capacitor in the stack, a voltage is applied to an input of a corresponding regulating converter, which converts the voltage to a regulated output signal (block 126). Input currents of one or more of the regulating converters are modulated in a manner that increases the power factor of the power converter circuit (block 128). In some implementations, input currents of all active regulating converters are modulated. In some embodiments, the input currents are modulated in a manner that results in an input current of the power conversion circuit taking the form of a clipped sinusoid or a folded clipped sinusoid. The regulated output powers of the regulating converters are combined to form a combined power and the combined power is converted to a desired dc output voltage (block 130). In some embodiments, the number of capacitances in the stack that are active is adapted over time based on a predetermined criterion (e.g., line voltage level being used, etc.).

Although various circuits and systems described herein are referred to as grid interface power converters, it should be appreciated that the techniques, principles, features, and structures described herein also have application in systems that do not involve a grid interface. That is, the concepts described herein have application in any number of different power conversion scenarios and may involve conversion from ac to dc, conversion from dc to ac, or both.

Having described example embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A power converter circuit comprising:
a line frequency rectifier circuit having an input and an output wherein in response to an alternating current (ac) input voltage of the power converter circuit being provided to the input of said line frequency rectifier circuit, said line frequency rectifier circuit rectifies the ac input voltage and provides a rectified output voltage at the output thereof;
a plurality of capacitors coupled to form a stack of capacitors, the stack of capacitors coupled to the output of the line frequency rectifier circuit so as to receive an output signal of the line frequency rectifier circuit such that a total voltage across the stack of capacitors is equal to a voltage at the output of the line frequency rectifier circuit;
a set of regulating converters coupled to the stack of capacitors, such that each regulating converter in the set of regulating converters is capable of drawing current from a corresponding one of the plurality of capacitors which form the stack of capacitors and generating a regulated voltage output power at an output thereof; and
a power combining converter circuit coupled to receive and combine the regulated voltage output powers generated by the set of regulating converters to convert the combined power to a desired direct current (dc) output voltage.

2. The power converter circuit of claim 1, further including:
a controller configured to controllably modulate input current of one or more of the regulating converters in the set of regulating converters in a manner that results in a power factor at the ac input of the power converter circuit that is greater than or equal to 0.8 for at least some operating conditions.

3. The power converter circuit of claim 1, further including:
a controller configured to controllably modulate input current of all of the regulating converters in the set of regulating converters in a manner that enhances power factor at the ac input of the power converter circuit.

4. The power converter circuit of claim 1, wherein:
the set of regulating converters includes at least one inverted resonant-transition buck converter or synchronous resonant-transition buck converter.

5. The power converter circuit of claim 1, wherein:
the set of regulating converters includes at least one buck converter.

6. The power converter circuit of claim 1, wherein:
the stack of capacitors buffers a substantial portion of a twice-line-frequency energy.

7. The power converter circuit of claim 6, wherein:
one or more capacitors in the stack of capacitors has a capacitance value that is substantially greater than capacitors in the stack of capacitors not including the one or more capacitors, wherein the one or more capacitors buffers a greater portion of the twice-line frequency than the capacitors in the stack of capacitors not including the one or more capacitors.

8. The power converter circuit of claim 1, wherein:
the power combining converter circuit includes a switched capacitor circuit.

9. The power converter circuit of claim 1, wherein:
the power combining converter circuit provides electrical isolation.

10. The power converter circuit of claim 1, wherein:
the power combining converter circuit includes a buck-boost converter.

11. The power converter circuit of claim 1, wherein:
the power combining converter circuit includes a flyback converter.

12. The power converter circuit of claim 1, wherein:
the power combining converter circuit is configured to combine the regulated voltage output powers of the regulating converters to a single output.

13. The power converter circuit of claim 12, wherein:
the controller is configured to adapt a quantity of capacitors and regulating converters that are operative at a particular time.

14. The power converter circuit of claim 12, wherein:
the controller is configured to adapt a quantity of capacitors and regulating converters that are operative at a particular time based, at least in part, on a line voltage currently being used.

15. The power converter circuit of claim 1, wherein:
the stack of capacitors has three or more stacked capacitors and the set of regulating converters has one converter for each of the three or more stacked capacitors.

16. A machine implemented method of operating a power converter circuit comprising:
rectifying an alternating current (ac) line voltage;
applying the rectified ac line voltage across a stack of capacitors, the stack of capacitors having at least two stacked capacitors;
for each of the capacitor in the stack of capacitors, applying a corresponding voltage to an input of a corresponding regulating converter to convert the voltage to a regulated output signal;
modulating an input current of one or more of the regulating converters in a manner that increases power factor of the power converter circuit; and
combining the regulated output signals of the regulating converters to generate a combined signal and converting the combined signal to a desired direct current (dc) output voltage.

17. The method of claim 16, wherein:
applying the rectified ac line voltage across a stack of capacitors comprises storing energy in the stack of capacitors, wherein the energy stored in the stack of capacitors is utilized to buffer a substantial portion of twice-line-frequency energy processed by the system.

18. The method of claim 16, further comprising:
adapting a select number of capacitors in the stack of capacitors that are active based on a predetermined criterion.

19. The method of claim 16, further comprising:
adapting a select number of capacitors in the stack of capacitors that are active based on a line voltage level currently being used.

20. The method of claim 16, further comprising:
providing electrical isolation between the regulated output signals of the regulating converters and the dc output voltage of the machine implemented method of operating a power converter circuit.

21. The method of claim 16, further comprising:
providing switched capacitive energy transfer to combine the output signals of the regulating converters to provide the dc output voltage of the system.

22. The method of claim 16, further wherein combining the regulated output signals of the regulating converters comprises combining the power delivered to the regulated output signals of the regulating converters to provide the full power to a single combined output of the power converter circuit.

23. A system comprising:
a single phase alternating current (ac) voltage source having a pair of terminals across which on ac signal may be provided; and
a power converter circuit having an input and an output, said power converter circuit comprising:
a line frequency rectifier circuit having a pair of input terminals corresponding to the input of said power converter circuit and a pair of output terminals with a first one of the pair of input terminals coupled a first one of the pair of terminals of said single phase ac voltage source and having a second one of the pair of input terminals coupled to a second one of the pair of terminals of said single phase ac voltage source such that in response to an ac signal provided to the input thereof from said single phase ac voltage source, said line frequency rectifier circuit provides a rectified voltage across the pair of output terminals thereof;
a stacked capacitor circuit provided from a plurality of capacitors, said stacked capacitor circuit having a first terminal coupled to a first one of the pair of output terminals of said line rectifier circuit and having a second terminal coupled to a second one of the pair of output terminals of said line rectifier circuit such that in response to a rectified voltage across the pair of output terminals of said line frequency rectifier circuit, a total voltage across said stacked capacitor circuit is equal to a voltage across the pair of output terminals of said line frequency rectifier circuit;
a set of regulating converters coupled to said the stacked capacitor circuit such that each regulating converter in the set of regulating converters is capable of drawing current from a corresponding one of said plurality of capacitors in said stacked capacitor circuit and generating a regulated voltage output power at an output thereof; and
a power combining converter circuit coupled to said set of regulating converters such that in response to receiving regulated voltage output powers generated by said set of regulating converters, said power combining converter circuit combines the regulated voltage output powers and converts the combined power to a desired direct current (dc) output voltage at the output of said power converter circuit.

* * * * *

UNITED STATES PATENT AND TRADEMARK OFFICE
CERTIFICATE OF CORRECTION

PATENT NO. : 9,660,520 B2
APPLICATION NO. : 14/758033
DATED : May 23, 2017
INVENTOR(S) : David J. Perreault et al.

Page 1 of 2

It is certified that error appears in the above-identified patent and that said Letters Patent is hereby corrected as shown below:

In the Specification

Column 1, Line 43, delete "de-dc" and replace with --dc-dc--

Column 1, Line 45, delete "do" and replace with --dc--

Column 1, Line 53, delete "do" and replace with --dc--

Column 1, Line 56, delete "do" and replace with --dc--

Column 1, Line 62, delete "do" and replace with --dc--

Column 3, Line 9, delete "or outputs" and replace with --or more outputs--

Column 3, Line 22-24, delete "In some embodiments, the set of regulating converters includes at least one inverted resonant-transition buck converter."

Column 11, Line 49, delete "capacitor" and replace with --capacitor is--

Column 12, Line 52, delete "do-" and replace with --dc- --

Column 13, Line 12, delete "range the" and replace with --range. The--

Column 14, Line 18, delete "describe" and replace with --described--

Column 14, Line 49, delete "pro-defined" and replace with --pre-defined--

Column 15, Line 38, delete "way" and replace with --ways--

Column 15, Line 51, delete "like example inverted" and replace with --for example the inverted--

Signed and Sealed this
Ninth Day of July, 2019

Andrei Iancu
*Director of the United States Patent and Trademark Office*

CERTIFICATE OF CORRECTION (continued)
U.S. Pat. No. 9,660,520 B2

Column 17, Line 20, delete "as flyback" and replace with --as a flyback--

In the Claims

Column 20, Line 19, delete "on ac" and replace with --an ac--

Column 20, Line 26, delete "coupled a" and replace with --coupled to a--